United States Patent [19]

Okada

[11] Patent Number: 5,511,137
[45] Date of Patent: Apr. 23, 1996

[54] PROCESS AND APPARATUS FOR IMAGE MAGNIFICATION

[75] Inventor: Yoshiyuki Okada, Isehara, Japan

[73] Assignee: Fujitsu Limited, Kawasaki, Japan

[21] Appl. No.: 332,442

[22] Filed: Oct. 31, 1994

Related U.S. Application Data

[63] Continuation of Ser. No. 79,381, Jun. 21, 1993, abandoned, which is a continuation of Ser. No. 333,198, Apr. 5, 1989, abandoned.

[30] Foreign Application Priority Data

Apr. 7, 1988 [JP] Japan .................................. 63-084055
Aug. 30, 1988 [JP] Japan .................................. 63-213672

[51] Int. Cl.$^6$ .................................................. G06K 9/32
[52] U.S. Cl. ..................... 382/298; 382/300; 382/199; 358/451; 345/130
[58] Field of Search .................................. 382/47, 22, 21, 382/44, 298, 300, 293, 294, 197, 199, 203, 206, 209, 216; 358/451; 345/55, 127, 129, 130; 364/723

[56] References Cited

U.S. PATENT DOCUMENTS

| | | | |
|---|---|---|---|
| 4,075,663 | 2/1978 | Wellendorf | 358/451 |
| 4,630,947 | 12/1986 | Yoshida et al. | 400/124 |
| 4,680,720 | 7/1987 | Yoshii et al. | 364/521 |
| 4,837,562 | 6/1989 | Nishiura et al. | 340/728 |

FOREIGN PATENT DOCUMENTS

| | | | |
|---|---|---|---|
| 58-97958 | 4/1981 | Japan | H04N 1/02 |
| 58-141076 | 8/1983 | Japan | 358/451 |

OTHER PUBLICATIONS

H. Morita et al. "A Technique For High–Speed Pixel Density Transformation Based on The Projection Method", Journal of Electronic Imagery, vol. 11, No. 2, 1982, pp. 72–83.

*Primary Examiner*—Jose L. Couso
*Assistant Examiner*—Phuoc Tran
*Attorney, Agent, or Firm*—Staas & Halsey

[57] ABSTRACT

A process and apparatus for determining values of new pixels which are to be interpolated between original pixels of an image during magnification of the image. The interpolation is carried out in each unit area which is surrounded by original pixel centers. The process includes the following steps: a first step for detecting an angle of an original line image in a predetermined vicinity of the unit area by comparing values of a combination of original pixels in the predetermined vicinity of the unit area with each of a plurality of predetermined patterns of an arrangement of pixel values; a second step for selecting one of a plurality of predetermined modes of division of the unit area so that an angle of a dividing line which divides the unit area in the selected mode of division conforms to the angle detected in the first step; and a third step for determining a value of each of the new pixels by assigning a value which is determined based on the values of the original pixels in the vicinity to all of the new pixels the centers of which are in each section of the unit area which were generated by the mode of division selected in the second step.

13 Claims, 27 Drawing Sheets

Fig. 3A
PRIOR ART
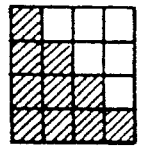  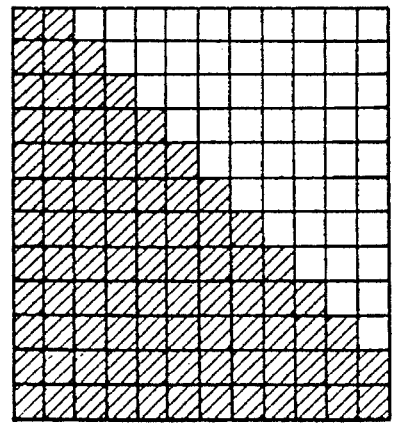
Fig. 3B
PRIOR ART
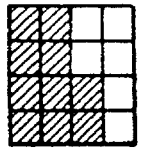  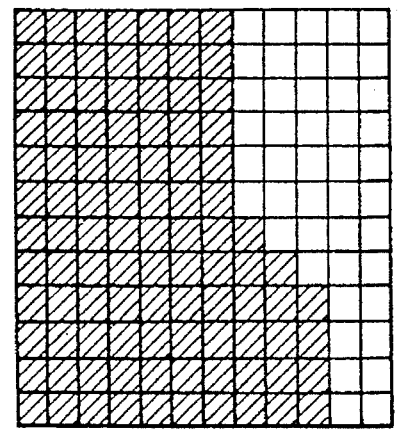
Fig. 3C
PRIOR ART
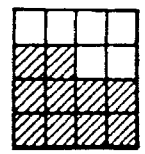  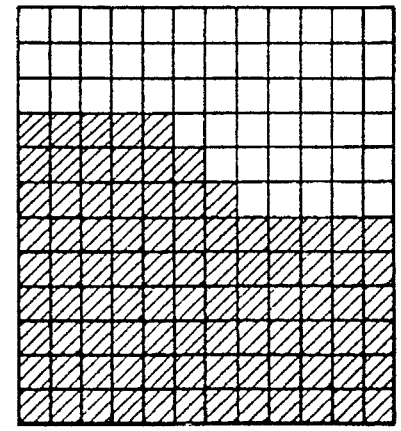

● : ORIGINAL PIXEL

× : CONVERTED PIXEL

Fig. 5

| TYPE | COMBINATION OF PIXELS | PATTERNS |
|---|---|---|
| P1 | | |
| P2 | | |
| P3 | | |
| P4 | | |
| P5 | | |
| P6 | | |
| P7 | | |
| P8 | | |

Fig. 9

| SECTION | LOGICAL EXPRESSION |
|---|---|
| G1 | A |
| G2 | B |
| G3 | C |
| G4 | D |
| G5 | $A*(B+C+D+\overline{F}*\overline{K})+B*C*D*(\overline{F}+\overline{K})$ |
| G6 | $B*(A+C+D+\overline{E}*\overline{H})+A*C*D*(\overline{E}+\overline{H})$ |
| G7 | $C*(A+B+D+\overline{G}*\overline{J})+A*B*D*(\overline{G}+\overline{J})$ |
| G8 | $D*(A+B+C+\overline{I}*\overline{L})+A*B*C*(\overline{I}+\overline{L})$ |
| G9, G9' | $\overline{A}$ |
| G10, G10' | $\overline{B}$ |
| G11, G11' | $\overline{C}$ |
| G12, G12' | $\overline{D}$ |

\*: LOGICAL AND     +: LOGICAL OR o : ORIGINAL WHITE PIXEL

● : ORIGINAL BLACK PIXEL

· : CONVERTED PIXEL

● : ORIGINAL PIXEL CENTER

× : CONVERTED PIXEL CENTER

| SUB-AREA | MODE OF DIVISION | | | |
|---|---|---|---|---|
| R1 | M1(P1-1,2) | M2(P1-3,4) | M3(P2-1,2) | M4(P3-1,2) |
| | M5(P1-5,6) | | M6(P1-7,8) | |
| R2 | M1(P1-1,2) | M2(P1-3,4) | M3(P2-1,2) | M4(P3-1,2) |
| | M5(P1-5,6) | | M6(P1-7,8) | |

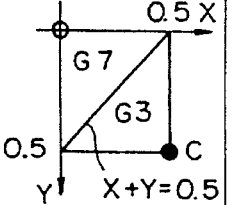

Fig. 17

| SECTION | LOGICAL EXPRESSION |
|---------|--------------------|
| G 1 | A |
| G 2 | B |
| G 3 | C |
| G 4 | D |
| G 5 | A * (B+C+D) + B * C * D |
| G 6 | B * (A+C+D) + A * C * D |
| G 7 | C * (A+B+D) + A * B * D |
| G 8 | D * (A+B+C) + A * B * C |
| G 9 | $\overline{A}$ |
| G 10 | $\overline{B}$ |
| G 11 | $\overline{C}$ |
| G 12 | $\overline{D}$ |

● : ORIGINAL PIXEL
× : CONVERTED PIXEL

Fig. 19A o : ORIGINAL WHITE PIXEL

● : ORIGINAL BLACK PIXEL

・ : CONVERTED PIXEL

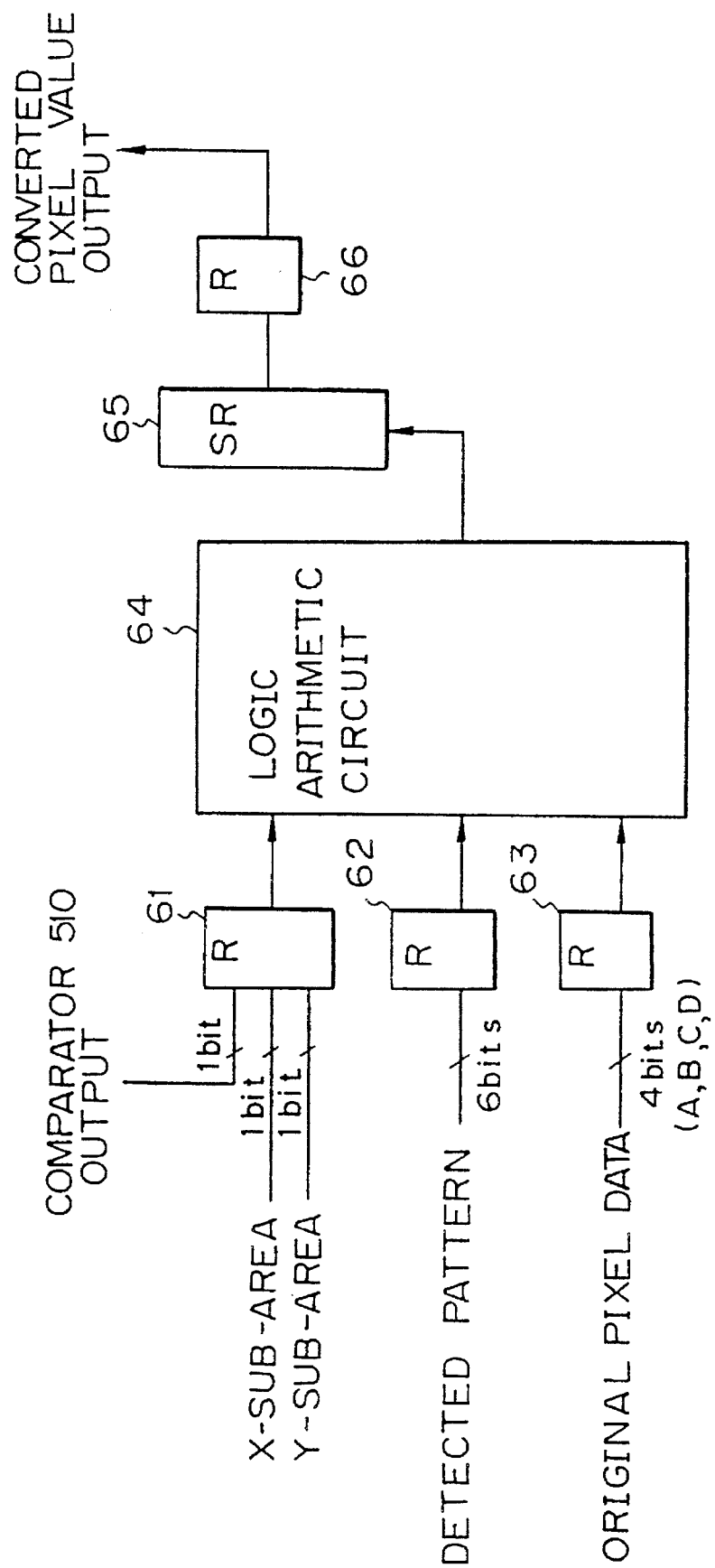

PROCESS AND APPARATUS FOR IMAGE MAGNIFICATION

This application is a continuation, of application Ser. No. 08/079,381, filed Jun. 21, 1993, now abandoned, which is a continuation, of application Ser. No. 07/333,198, filed Apr. 5, 1989, now abandoned.

BACKGROUND OF THE INVENTION

1. Field of the Invention

The present invention relates to a process and an apparatus for image magnification, and in particular, to a process and an apparatus for determining values of new pixels which are to be interpolated between original pixel centers constituting an original image.

The process and apparatus for image magnification of the present invention covers both simple image magnifications with a constant pixel density carried out in image display and image printing, and an increase in pixel density, for example, in the conversion from a Group 3 (G4) type to a Group 4 (G4) type in facsimile transmission systems.

2. Description of the Related Art

In the prior art, a high speed projection method for magnifying an image is proposed in Japanese Unexamined Patent Publication A58-97958 and the Journal of the Institute of Image Electronics Engineers of Japan vol. 11, NO. 2, 1982, pp 72~pp 83.

The high speed projection method realizes a high speed processing for determination of the concentration of the converted pixels by carrying out a logic calculation instead of an arithmetic calculation, when magnifying an image.

FIG. 1 shows an example of a process in the high speed projection method.

In the high speed projection method, as a first step, a unit area surrounded by four adjacent original pixel centers is divided into four sections each of which corresponds to one of the four adjacent original pixel centers, and all points in each section are nearer to the corresponding one of the four adjacent original pixel centers, than the other three.

As a second step, an area of a converted pixel is projected on the unit area in which the converted pixel center exists as shown in FIG. 1. When magnification rates in the lateral (horizontal) direction and in the longitudinal (vertical) direction are each p and q, a lateral side of the area of the converted pixel is 1/p of a lateral side of an area of an original pixel, and a longitudinal side of the area of the converted pixel is 1/q of a longitudinal side of the area of the original pixel.

When the concentrations of the above four adjacent pixels are each denoted by $I_A$, $I_B$, $I_C$, and $I_D$, and a proportion of the area of a converted pixel projected on each of the above sections is denoted by $W_A$, $W_B$, $W_C$, and $W_D$, the concentration of the converted pixel is expressed as $I_R = p\Sigma I_i * W_i$ (i=A, B, C, and D), and the calculated value $I_R$ is quantized to a two-valued state. That is, $I_R$ is made to one (black) when the calculated $R_R$ is larger than or equal to 0.5, and $R_R$ is made to zero (white) when the calculated $I_R$ is smaller than 0.5.

In the high speed projection method, the above multiplication and summation for obtaining $I_R$ is replaced by logic calcutions, as explained in the following, to realize a high speed processing.

First, when a center of a converted pixel is within a vicinity of each of the four adjacent original pixel centers, the above calculated value of the concentration $I_R$ is equal to the concentration value of the corresponding (nearest) original pixel regardless of the other three original pixels. The boundary of the vicinity is generally given as a hyperbolic curve for each of the original pixels. However, as the magnification rate becomes large, the boundary comes close to the center of the unit area, i.e., the boundaries for the four original pixels come close to the lines which divide the unit area into the above four sections, i.e., x=0, and y=0. Therefore, a smooth oblique line in an original image becomes a step-like, angular shape when magnified by a large magnification rate.

On the other hand, generally, the hyperbolic boundary causes another calculational complexity. Thus, the boundary lines x±y=±½, were assumed in the conventional high speed projection method as shown in FIG. 2, to avoid the step-like, angular shape which appeared in a magnified oblique line, and to reduce the calculational complexity.

Nevertheless, the conventional high speed projection method as mentioned above is effective to realize a smoothness in magnified oblique lines in the angle of 45 degrees only. Hence, the magnified oblique lines with angles other than 45 degrees have an unnatural shape.

FIGS. 3A, 3B, and 3C each show a magnification result of an oblique line image in an original image by the conventional high speed projection method, wherein the angle of the oblique line is 45 degrees in FIG. 3A, a middle angle between 45 degrees and 90 degrees in FIG. 3B, and a middle angle between 0 and 45 degrees in FIG. 3C, respectively.

As shown in FIGS. 3A, 3B, and 3C, a satisfactorily smooth magnification is not assurerd for oblique lines in an angle other than 45 degree. In particular, when a magnification rate becomes large, the step-like shape becomes prominent.

SUMMARY OF THE INVENTION

The object of the present invention is to provide a process and apparatus for image magnification whereby smooth magnifications of oblique line images in angles other than 45 degrees are possible.

According to the present invention, there is provided a process for determining values of new pixels which are to be interpolated in a unit area which is surrounded by original pixel centers, when magnifying an image consisting of original pixels, comprising: a first step for detecting an angle of an original line image in a predetermined vicinity of the unit area by comparing values of a combination of original pixels in the predetermined vicinity of the unit area with each of a plurality of predetermined patterns of an arrangement of pixel values; a second step for selecting one of a plurality of predetermined modes of division of the unit area so that an angle of a dividing line which divides the unit area in the selected mode of division conforms to the angle detected in the first step; and a third step for determining a value of each of the new pixels by assigning a value which is determined based on the values of the original pixels in the vicinity, to all of the new pixels the centers of which are in each section of the unit area which section is generated by the mode of division selected in the second step.

According to another aspect of the present invention, there is provided an apparatus for determining values of new pixels which are to be interpolated in a unit area which is surrounded by original pixel centers, when magnifying an image consisting of original pixels, comprising: a new pixel coordinate generating unit for generating a coordinate of a center of a new pixel for interpolating between the original pixel centers, according to a magnification rate; a pattern comparator unit for detecting one of a plurality of predetermined line images by comparing values of a combination of original pixels in a predetermined vicinity of the unit area with each of a plurality of predetermined patterns; a selector unit for selecting one of a plurality of predetermined modes of division of the unit area according to the line image detected in the pattern comparator unit, wherein the plurality of predetermined modes of division are provided, in advance, corresponding to the predetermined patterns; a section determining unit for determining in which section the center of the new pixel is, in accordance with information from the lines dividing the unit area in the mode of division which is selected by the selector unit, wherein the section is one of a plurality of sections which is generated by each of the modes of division so that each of the new pixels in a section has the same value determined by values of the original pixels in the predetermined vicinity; and a new pixel value determining unit for determining the value of the new pixel according to the values of the original pixels in the predetermined vicinity and the section which is determined by the section determining unit.

BRIEF DESCRIPTION OF THE DRAWINGS

In the drawings:

FIGS. 3A, 3B, and 3C are diagrams illustrating a magnification result of an oblique line image in an original image by the conventional high speed projection method;

FIG. 5 is a table illustrating example of predetermined patterns;

FIG. 9 is a table illustrating the value assigned for the pixels the center of which are in each section generated by the dividing operation shown in FIGS. 6, 7A, 7B, 7C, 7D, 7E, 8A, 8B, 8C, 8D, and 8E;

FIG. 15 is a table illustrating the combinations and the patterns which are predetermined for each of the sub-areas R1, R2, R3, and R4;

FIGS. 16A and 16B are tables illustrating the modes of division in the second embodiment of the present invention;

FIG. 17 is a table illustrating the logical expressions for obtaining values of the new pixels the center of which exists in each of the sections;

FIGS. 19A and 19B are tables illustrating the combinations and the patterns which are predetermined for each of the sub-areas R1, R2, R3, and R4;

FIG. 23D is a block diagram of an example of the construction of the converted pixel value calculating portion 6 in FIG. 22.

DESCRIPTION OF THE PREFERRED EMBODIMENTS

As mentioned in the summary of the invention, as a first step of the present invention, an angle of an original line image in a predetermined vicinity of the unit area is detected by comparing values of a combination of original pixels in a predetermined vicinity of the unit area with each of a plurality of predetermined patterns.

Figure 4:
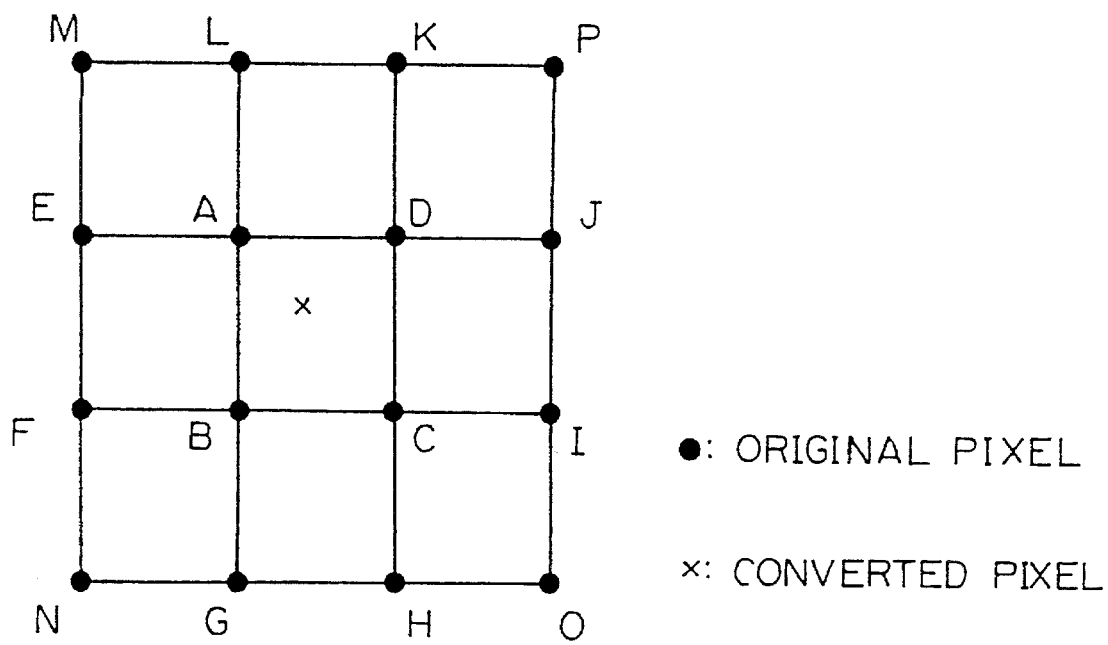
FIG. 4 is a diagram of the original pixel centers used in a step for comparing values of a combination of the original pixels in a predetermined vicinity of a unit area with each of several predetermined patterns.

FIG. 4 shows the original pixel centers used in a step for comparing values of a combination of the original pixels in a predetermined vicinity of a unit area with each of several predetermined patterns.

The area surrounded by the four original pixel centers A, B, C, and D, is a unit area wherein new (converted) pixels are to be interpolated, and the other twelve original pixel centers denoted by M, L, K, P, E, J, F, I, N, G, H, and O, together with the above A, B, C, and D, are included in the above predetermined vicinity of the unit area. More particularly, in the first step of the present invention, values of a combination of these sixteen original pixels are compared with each of the predetermined patterns.

An example of the above predetermined patterns are shown in FIG. 5.

The patterns are sorted into eight types each denoted by P1, P2, P3, P4, P5, P6, P7, and P8, according to the combination of the original pixel centers as shown in FIG. 5.

In the types P1 to P4, pattern Nos. 1 and 5 correspond to an oblique line image at the angle 45 degrees, i.e., $\theta=\tan^{-1} 1$, pattern Nos. 2 and 6 correspond to $\theta=\tan^{-1} 2$, pattern Nos. 3 and 7 correspond to $\theta=\tan^{-1} 1/2$, and pattern Nos. 4 and 8 each correspond to a pattern showing a right-angled corner.

In the types P5 and P6, each pattern corresponds to a portion of an oblique line image at the angle $\theta=\tan^{-1} 2$ in a unit area continuing to another unit area in which one of the above pattern Nos. 2 and 6 in the types P1 to P4 (corresponding to a line image at the angle $\theta=\tan^{-1} 2$) detected through the above comparison. That is, a unit area regarding one of the patterns in the types P5 and P6 detected through the above comparison corresponds to a portion of the line image at the angle $\theta=\tan^{-1} 2$, which portion continues to another portion in another unit area wherein one of the above pattern Nos. 2 and 6 in the types P1 to P4 is detected.

Similarly, in the types P7 and P8, each pattern corresponds to a portion of an oblique line image at the angle $\theta=\tan^{-1} 1/2$ in a unit area continuing to another unit area regarding which one of the above Nos. 3 and 7 patterns in the types P1 to P4 (corresponding to a line image at the angle $\theta=\tan^{-1} 1/2$) is detected through the above comparison. That is, a unit area regarding one of the patterns in the types P7 and P8 detected through the above comparison corresponds to a portion of the line image at the angle $\theta=\tan^{-1} 1/2$ continuing to another portion in another unit area wherein one of the above Nos. 3 and 7 patterns in the types P1 to P4 is detected.

Figure 10:
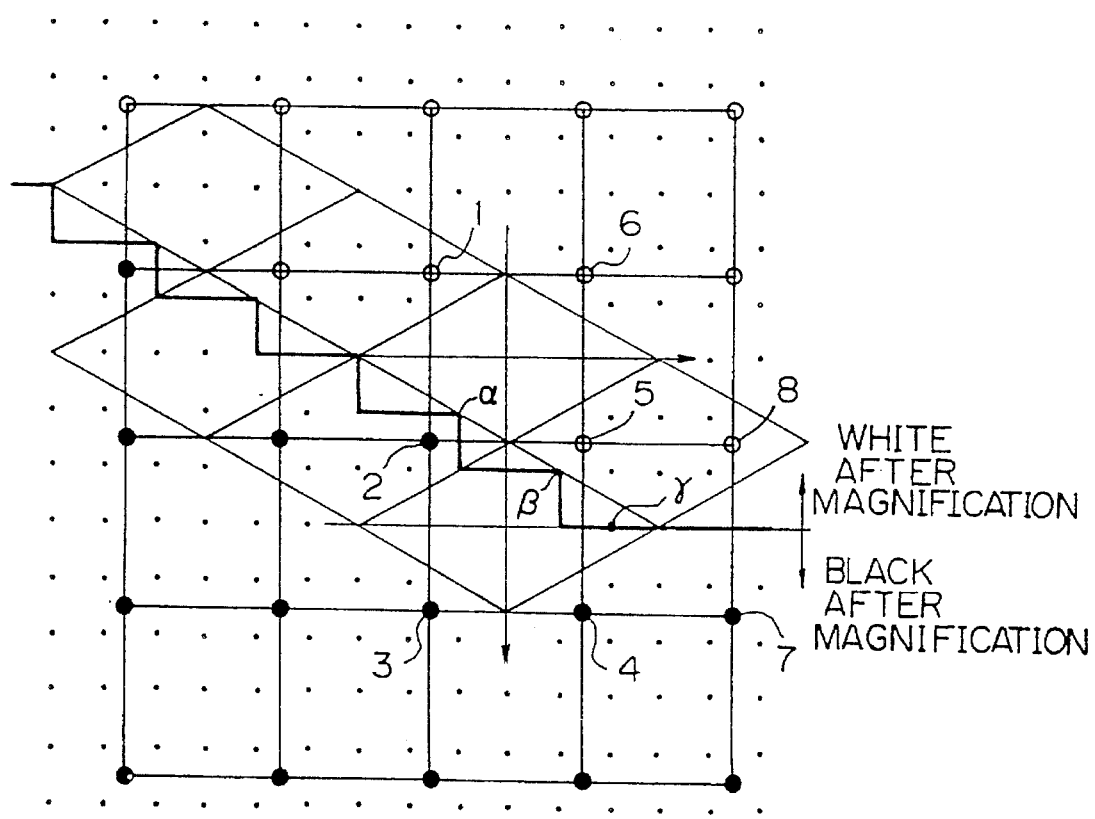
FIG. 10 is a diagram illustrating an example of a process of the first embodiment of the present invention.

The above-mentioned continuations are explicitly shown in the example of FIG. 10.

As a second step of the present invention, a selection of one of a plurality of predetermined modes of division of the unit area is carried out according to the line image detected in the first step. The plurality of predetermined modes of division are provided in advance corresponding to the predetermined patterns so that each of the new pixels in a section which is generated by one of the modes of division has the same value determined by values of the original pixels in the predetermined vicinity.

A plurality of the predetermined modes of division of the unit area are shown in FIGS. 6, 7A, 7B, 7C, 7D, 7E, 8A, 8B, 8C, 8D, and 8E.

Figure 1:
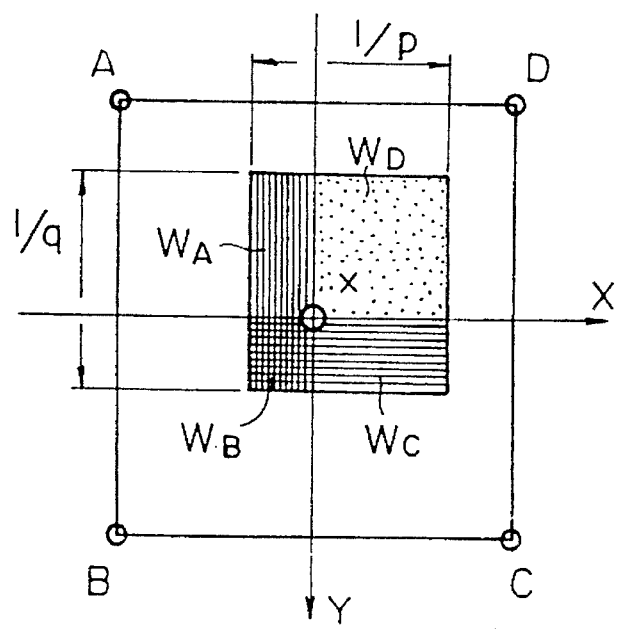
FIG. 1 is a diagram illustrating an example of a process in the high speed projection method.
Figure 2:
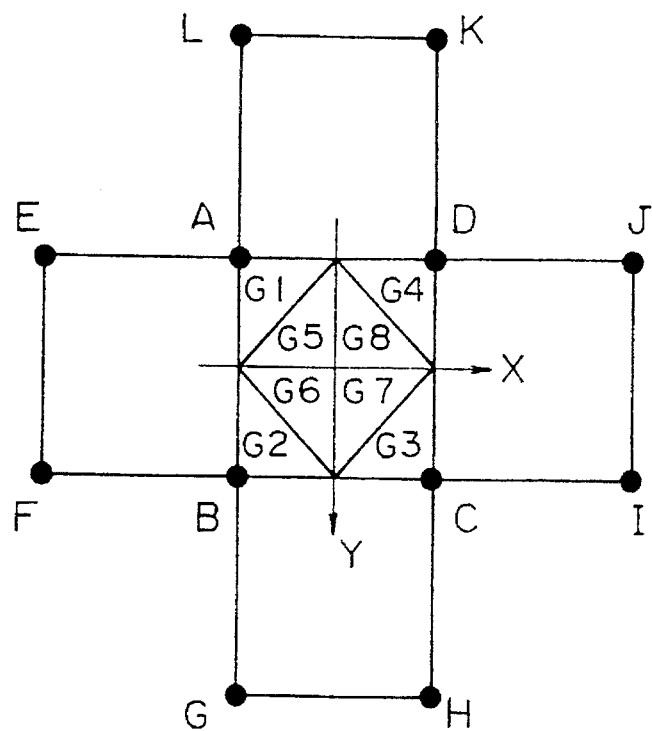
FIG. 2 is a diagram illustrating a conventional high speed projection method.
Figure 6:
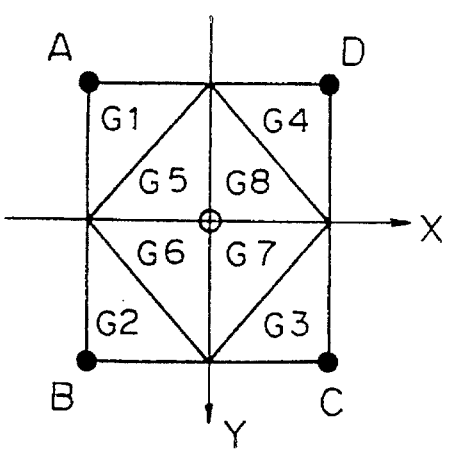
FIGS. 6, 7A, 7B, 7C, 7D, 7E, 8A, 8B, 8C, 8D, and 8E are diagrams illustrating a plurality of the predetermined modes of division of the unit area.

The mode of division shown in FIG. 6 corresponds to the patterns of Nos. 1, 4, 5, and 8 in the types P1 to P4 in FIG. 5. This mode of division is equal to the division shown in the conventional division of the unit area as shown in FIG. 2, i.e., the conventional high speed projection method provides only one mode of division of this type.

Figure 7A:
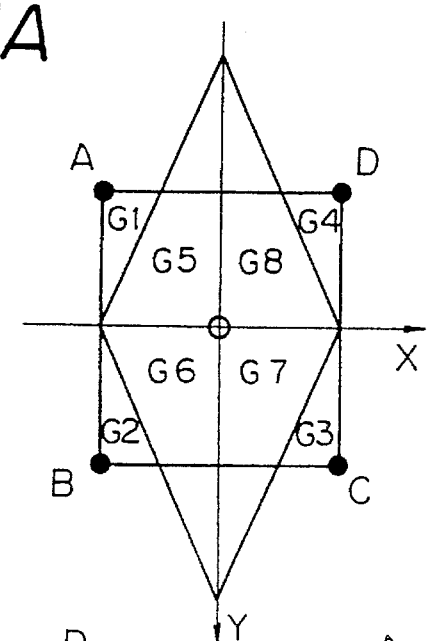

The mode of division shown in FIG. 7A corresponds to Nos. 2 and 6 in the types P1 to P4.

Figure 7B:
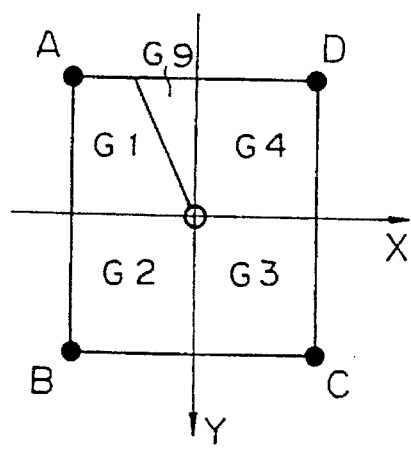

The mode of division shown in FIG. 7B corresponds to Nos. 1 and 2 in the type P5.

Figure 7C:
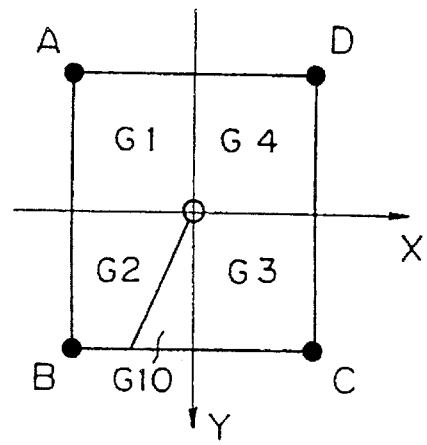

The mode of division shown in FIG. 7C corresponds to Nos. 1 and 2 in the type P6.

Figure 7D:
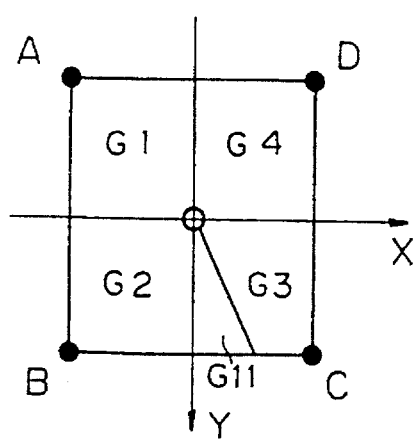

The mode of division shown in FIG. 7D corresponds to Nos. 3 and 4 in the type P6.

Figure 7E:
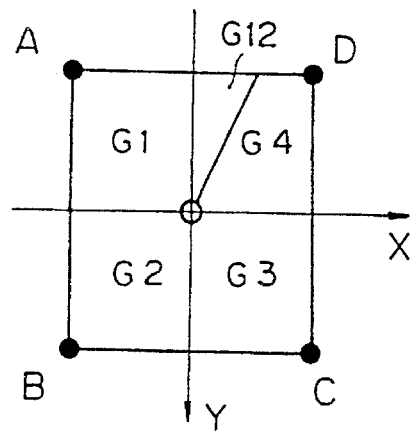

The mode of division shown in FIG. 7E corresponds to Nos. 3 and 4 in the type P5.

Figure 8A:
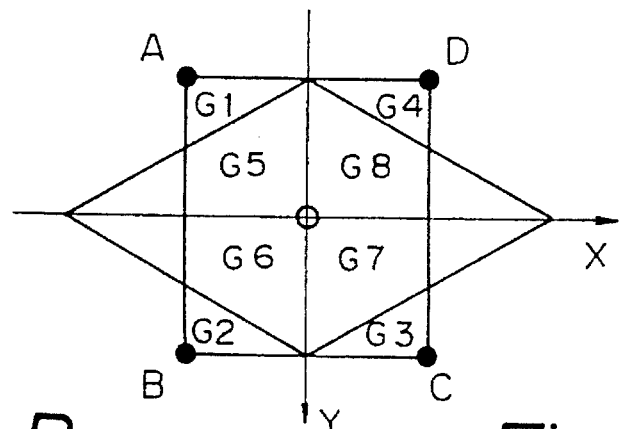

The mode of division shown in FIG. 8A corresponds to Nos. 3 and 7 in the types P1 to P4 in FIG. 5.

Figure 8B:
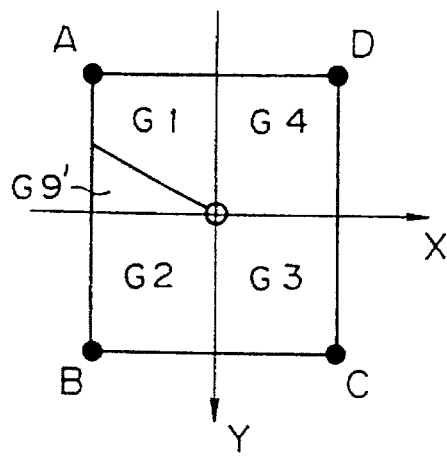

The mode of division shown in FIG. 8B corresponds to Nos. 1 and 2 in the type P7.

Figure 8C:
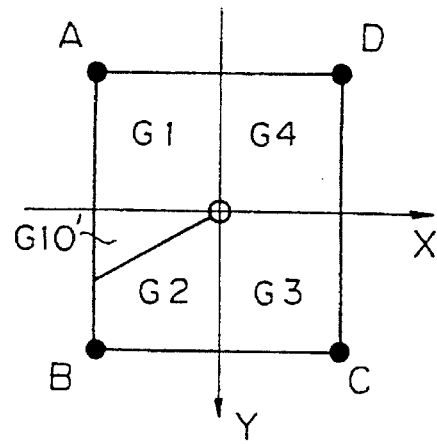

The mode of division shown in FIG. 8C corresponds to Nos. 3 and 4 in the type P7.

Figure 8D:
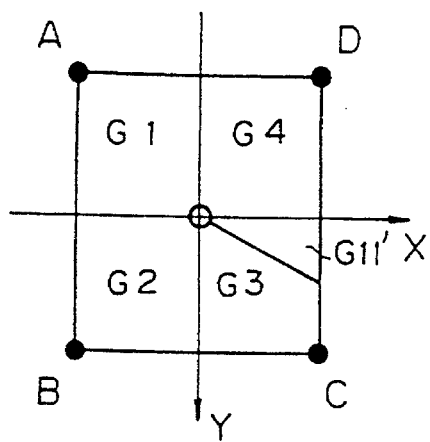

The mode of division shown in FIG. 8D corresponds to Nos. 3 and 4 in the type P8.

Figure 8E:
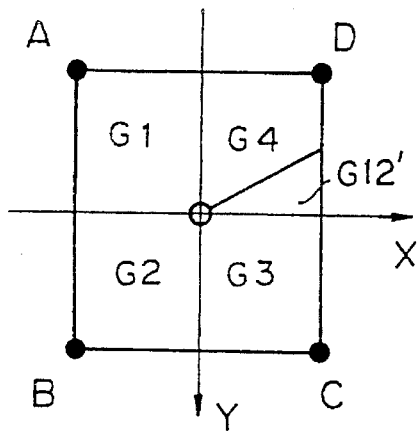

The mode of division shown in FIG. 8E corresponds to Nos. 1 and 2 in the type P8.

The lines dividing the unit area in the mode of FIG. 6, are $x=0$, $y=0$, $x\pm y=\frac{1}{2}$, and $x\pm y=-\frac{1}{2}$.

The lines dividing the unit area in the mode of FIG. 7A, are $x=0$, $y=0$, $x\pm y/2=\frac{1}{2}$, and $x\pm y/2=-\frac{1}{2}$.

The lines dividing the unit area in the mode of FIG. 7B are $x=0$, $y=0$, and $y=+2x\leq 0$, the lines dividing the unit area in the mode of FIG. 7C are $x=0$, $y=0$, and $y=-2x\geq 0$, the lines dividing the unit area in the mode of FIG. 7D are $x=0$, $y=0$, and $y=+2x\geq 0$, and the lines dividing the unit area in the mode of FIG. 7E are $x=0$, $y=0$, and $y=-2x\leq 0$.

The lines dividing the unit area in FIG. 8A are the lines determined by $x=0$, $y=0$, $x/2\pm y=\frac{1}{2}$, and $x/2\pm y=-\frac{1}{2}$.

The lines dividing the unit area in the mode of FIG. 8B are $x=0$, $y=0$, and $y=+(\frac{1}{2})x\leq 0$, the lines dividing the unit area in the mode of FIG. 8C are $x=0$, $y=0$, and $y=-(\frac{1}{2})x\geq 0$, the lines dividing the unit area in the mode of FIG. 8D are $x=0$, $y=0$, and $y=+(\frac{1}{2})x\geq 0$, and the lines dividing the unit area in the mode of FIG. 8E are $x=0$, $y=0$, and $y=-(\frac{1}{2})x\leq 0$.

Throughout FIGS. 6, 7A, 7B, 7C, 7D, 7E, 8A, 8B, 8C, 8D, and 8E, the point $(x,y)=(0,0)$ corresponds to the center of the unit area, the line determined by $x=0$ corresponds to the horizontal line, the line determined by $y=0$ corresponds to the vertical line, the lines determined by $x=\pm\frac{1}{2}$ and $y=\pm\frac{1}{2}$ correspond to the boundaries of the unit area.

As mentioned before, in the high speed projection method, all the new (converted) pixels the centers of which are in a section generated by the above dividing operation have the same (concentration or blightness) value which is determined by values of the original pixels in the predetermined vicinity.

FIG. 9 shows the value assigned to the pixels the center of which are in each section generated by the above dividing operation shown in FIGS. 6, 7A, 7B, 7C, 7D, 7E, 8A, 8B, 8C, 8D, and 8E.

The sections are shown by the common denotations, G1, G2, . . . G8, G9, G10, G11, G12, G9', G10', G11', and G12' in FIGS. 6, 7A, 7B, 7C, 7D, 7E, 8A, 8B, 8C, 8D, 8E and 9. In FIGS. 9, A, B, C, . . . , I, and L each denote the value of the corresponding one of the pixels shown by the same denotations in FIG. 4. The symbol + denotes a logical OR, * denotes a logical AND, and $\overline{A}$ denotes an inverse of the value of the pixel A, and or the like.

As shown in FIGS. 6, 7A, 7B, 7C, 7D, 7E, 8A, 8B, 8C, 8D, 8E and 9, the values of new (converted) pixels in a section G1, G2, G3, or G4 which are the nearest to each of the corners A, B, C, or D of the unit area ABCD among a plurality of sections generated by the mode of division selected in the second step of the present invention, are each equal to the value of the pixel the center of which is at the nearest corner.

Values of the new pixels in the section G9 the boundaries of which include both $x=0$ and $y=+2x$ (FIG. 7B), are each an inverse of the value of the pixel A the center of which is at a corner of the unit area which is the nearest to the section G9. Values of the new pixels in the section G10 the boundaries of which include both $x=0$ and $y=-2x$ (FIG. 7C), are each an inverse of the value of the pixel B the center of which is at a corner of the unit area which is the nearest to the section G10. Values of the new pixels in the section G11 the boundaries of which include both x=0 and y=+2x (FIG. 7D), are each an inverse of the value of the pixel C the center of which is at a corner of the unit area which is the nearest to the section G11. Values of the new pixels in the section G12 the boundaries of which include both x=0 and y=−2x (FIG. 7E), are each an inverse of the value of the pixel D the center of which is at a corner of the unit area which is the nearest to the section G12.

Further, values of the new pixels in the section G9' the boundaries of which include both y=0 and y=+(½)x (FIG. 8B), are each an inverse of the value of the pixel A the center of which is at a corner of the unit area which is the nearest to the section G9'. Values of the new pixels in the section G10' the boundaries of which include both y=0 and y=−(½)x (FIG. 8C), are each an inverse of the value of the pixel B the center of which is at a corner of the unit area which is the nearest to the section G10'. Values of the new pixels in the section G11' the boundaries of which include both y=0 and y=+(½)x (FIG. 8D), are each an inverse of the value of the pixel C the center of which is at a corner of the unit area which is the nearest to the section G11'. Values of the new pixels in the section G12' the boundaries of which include both y=0 and y=−(½)x (FIG. 8E), are each an inverse of the value of the pixel D the center of which is at a corner of the unit area which is the nearest to the section G12'.

The meaning of the assignment of the value $A*(B+C+D+\overline{F}*\overline{K}) + B*C*D*(\overline{F}+\overline{K})$ for the section G5, is as follows. Thus, G5 is black: when both A and B are black; when both A and C are black; or when both A and D are black (corresponding to $A*(B+C+D)$). G5 is black if A is black and B, C, D, F, and K are all white (corresponding to $A*(B+C+D+\overline{F}*\overline{K})$, and showing a right-angled corner by a white line image). On the other hand, G5 is white when B, C, D, F, and K are all black (corresponding to $B*C*D*(\overline{F}+\overline{K})$, and showing a right-angled corner by a black line image).

From the symmetricity of the divisions shown in FIGS. 6, 7A, 7B, 7C, 7D, 7E, 8A, 8B, 8C, 8D, and 8E, and the logical expressions shown in FIG. 9, the meanings of the assignments of the values for the other sections G6, G7, and G8 are understood by using similar considerations.

FIG. 10 shows an example of the operation of the first embodiment of the present invention. In the example of FIG. 10, the black and white circles positioned in a square-latticed arrangement are each the original pixel centers constituting an original image, where the black circle shows that the concentration value of the pixel is black, and the white circle shows that the concentration value of the pixel is white. The magnification rate in both the horizontal and the vertical directions is three. The small points which are arranged at three times the density of the original pixels correspond to the converted pixel centers.

To obtain the concentration value of the converted pixel the center of which is shown by α in FIG. 10, the unit area is the area surrounded by the four original pixels 1, 2, 5, and 6, because the pixel interpolates that area. That is, the pixels 1, 2, 5, and 6, are selected as the aforementioned pixels A, B, C, and D in the present invention.

As understood from the values of the original pixels shown in FIG. 10, through the operation of the comparison in the first step of the present invention, the correspondence with the pattern No. 7 in the type P2 in FIG. 5 is detected. Then the mode of division shown in FIG. 8A is selected in the second step of the present invention, and then it is detected that the coordinate of the converted pixel α is in the section G2. A convention that, when the coordinate of a converted pixel is on a line which divides a unit area, the converted pixel is assigned to the lower side of the sections divided by the line (hereinafter called lower side convention), is used in this embodiment. Thus, the value of the converted pixel α is equal to the value of the original pixel B. As B is black, the value of the converted pixel α is black.

To obtain the concentration value of the converted pixel the center of which is shown by β in FIG. 10, the unit area is the area surrounded by the four original pixels 2, 3, 4, and 5, because the pixel interpolates that area. That is, the pixels 2, 3, 4, and 5, are selected as the aforementioned pixels A, B, C, and D in the present invention.

As understood from the values of the original pixels shown in FIG. 10, through the operation of the comparison in the first step of the present invention, the correspondence with the pattern No. 3 in the type P4 in FIG. 5 is detected. Then the mode of division shown in FIG. 8A is selected in the second step of the present invention, and then it is detected that the coordinate of the converted pixel β is in the section G8 using the lower side convention used before. Thus, the value of the converted pixel β is assigned as $D*(A+B+C+\overline{I}*\overline{L})+A*B*C*(\overline{I}+\overline{L})$. As A, B, and C are black, and L is white, the value of the converted pixel β is black.

To obtain the concentration value of the converted pixel the center of which is shown by τ in FIG. 10, the unit area is the area surrounded by the four original pixels 5, 4, 7, and 8, because the pixel interpolates that area. That is, the pixels 5, 4, 7, and 8, are selected as the aforementioned pixels A, B, C, and D in the present invention.

As understood from the values of the original pixels shown in FIG. 10, through the operation of the comparison in the first step of the present invention, the correspondence with the pattern No. 1 in the type P7 in FIG. 5 is detected. The mode of division shown in FIG. 8B is then selected in the second step of the present invention, and then it is detected that the coordinate of the converted pixel τ is in the section G2. Thus, the value of the converted pixel τ is equal to the value of the original pixel B, i.e., the value of the converted pixel τ is black.

In FIG. 10, a thick line shows a boundary of the area where the converted pixels are black. Thus, a converted (magnified) line image at the angle $\tan^{-1}1/2$, which is smoother than the magnified line image by the conventional high speed projection method, is obtained by the first embodiment of the present invention.

Figure 11A:
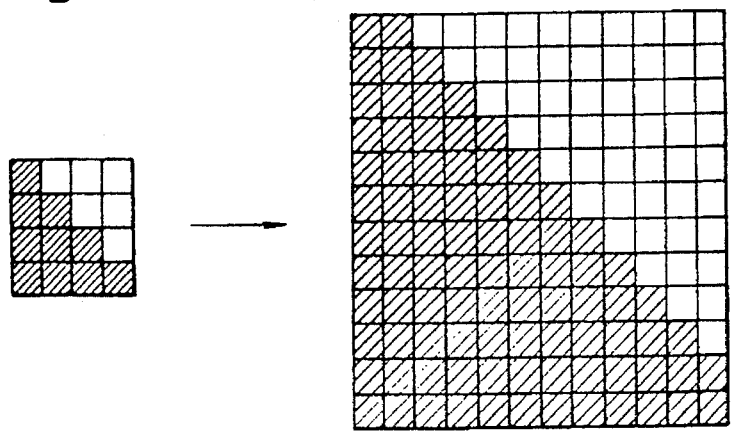
FIG. 11A is a diagram illustrating a magnification result of an oblique line image at the angle of 45 degrees.
Figure 11B:
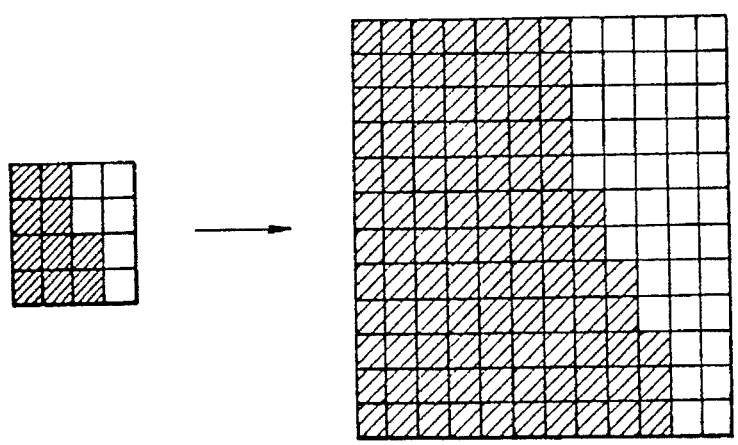
FIG. 11B is a diagram illustrating a magnification result of an oblique line image at the angle of $\theta=\tan^{-1}2$.
Figure 11C:
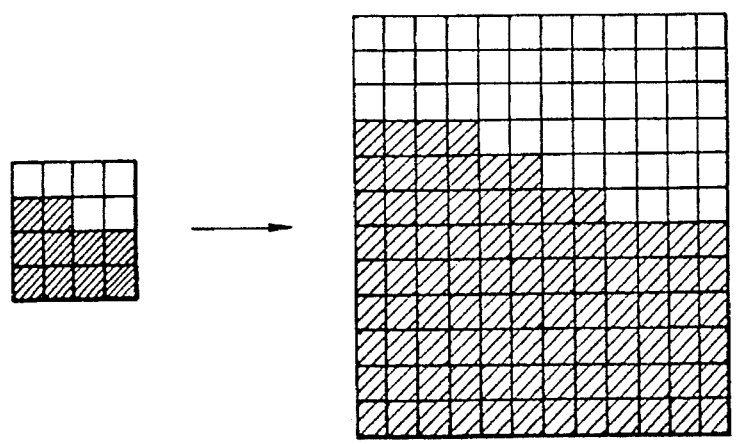
FIG. 11C is a diagram illustrating a magnification result of an oblique line image at the angle of $\theta=\tan^{-1}1/2$.

FIGS. 11A, 11B, and 11C show examples of the result of the magnification by the process for image magnification according to the present invention.

FIG. 11A shows a magnification result of an oblique line image at the angle of 45 degrees.

FIG. 11B shows a magnification result of an oblique line image at the angle of $\theta=\tan^{-1}2$.

FIG. 11C shows a magnification result of an oblique line image at the angle of $\theta=\tan^{-1}1/2$.

In each of FIGS. 11A, 11B, and 11C, the magnification rates in the horizontal and lateral directions are both three.

As understood by comparing the above results with the results of the conventional method shown in FIGS. 3A, 3B, and 3C, according to the present invention, the prominent step-like shapes which appeared in the conventional result are now much smoother.

Although, in the first embodiment of the present invention, only the line images at the angles of $\theta=\tan^{-1}1$, $\theta=\tan^{-1}2$, and $\theta=\tan^{-1}1/2$, are detected, and the modes of division of the unit area are provided as shown in FIGS. 6, 7A, 7B, 7C, 7D, 7E, 8A, 8B, 8C, 8D, and 8E, the above angles other than $\theta=\tan^{-1} 1$ may be changed to an arbitrary angles $\theta$. When the arbitrary angles each differ little from the $\theta=\tan^{-1} 2$ and $\theta=\tan^{-1} 1/2$, the patterns shown in FIG. 5 still may be used. The corresponding modes of division are shown in FIGS. 12A, 12B, 12C, 12D, 12E, 13A, 13B, 13C, 13D, and 13E.

FIGS. 12A, 12B, 12C, 12D and 12E show the mode of division corresponding to line images at the angle $\theta$ ($\tan^{-1} 1 < \theta < \tan^{-1} 2$), and FIGS. 13A, 13B, 13B, 13C, 13D, and 13E show the mode of division corresponding to line images at the angle $\theta$ ($\tan^{-1} 1/2 < \theta < \tan^{-1} 1$).

Figure 12A:
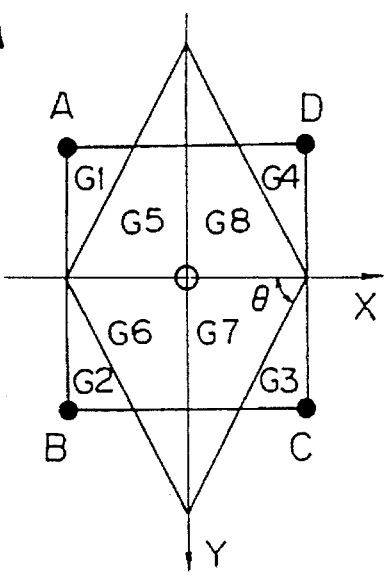
FIGS. 12A, 12B, 12C, 12D, and 12E are diagrams illustrating the mode of division corresponding to line images at the angle $\theta$ ($\tan^{-1}<\theta<\tan^{-1}2$)

The lines dividing the unit area in the mode shown in FIG. 12A, are $x=0$, $y=0$, $y=\pm(\tan\theta)(x-\frac{1}{2})$, and $y=\pm(\tan\theta)(x+\frac{1}{2})$.

Figure 12B:
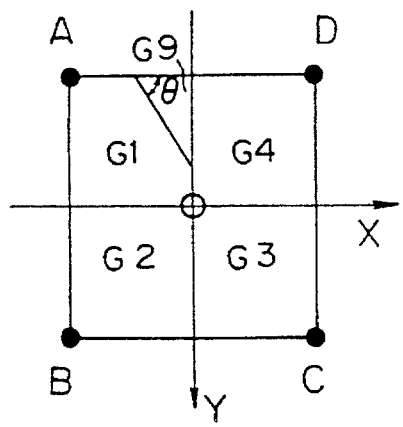

The lines dividing the unit area in the mode of FIG. 12B, are $x=0$, $y=0$, and $y+1-(\frac{1}{2})\tan\theta=+(\tan\theta)x\leq 0$.

Figure 12C:
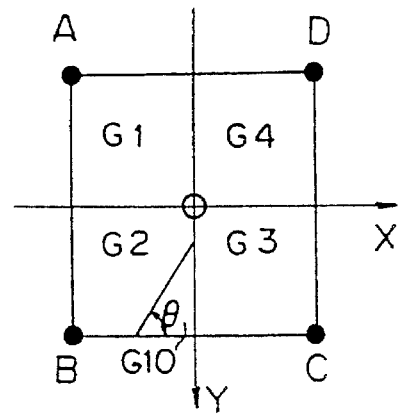

The lines dividing the unit area in the mode of FIG. 12C, are $x=0$, $y=0$, and $y-1+(\frac{1}{2})\tan\theta=-(\tan\theta)x\geq 0$.

Figure 12D:
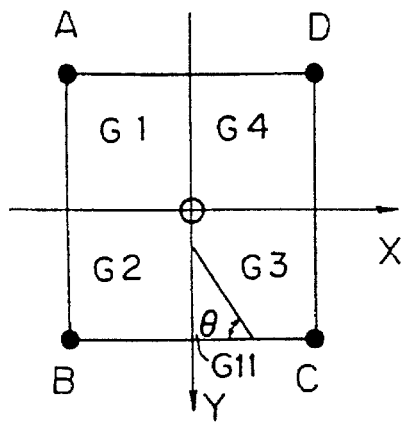

The lines dividing the unit area in the mode of FIG. 12D, are $x=0$, $y=0$, and $y-1+(\frac{1}{2})\tan\theta=+(\tan\theta)x\geq 0$.

Figure 12E:
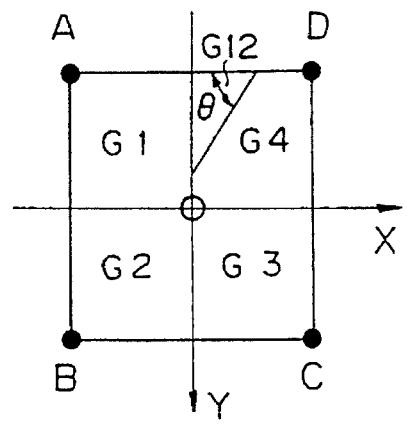

The lines dividing the unit area in the mode of FIG. 12E, are $x=0$, $y=0$, and $y+1-(\frac{1}{2})\tan\theta=-(\tan\theta)x\leq 0$.

Figure 13A:
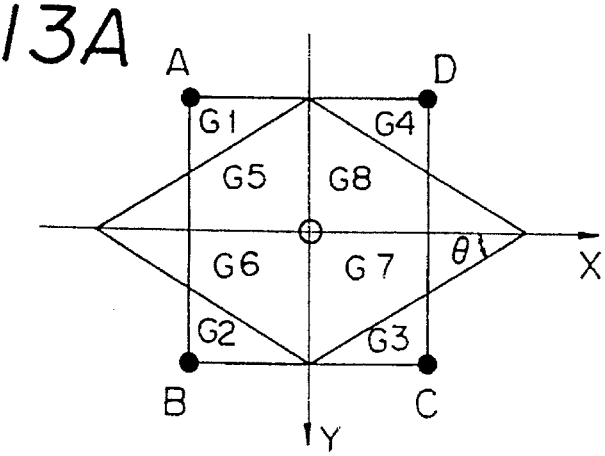
FIGS. 13A, 13B, 13C, 13D, and 13E are diagrams illustrating the mode of division corresponding the line images at the angle $\theta$ ($\tan^{-1}1/2<\theta<\tan^{-1}1$)

The lines dividing the unit area in the mode of FIG. 13A, are $x=0$, $y=0$, and $y-\frac{1}{2}=\pm(\tan\theta)x$, and $y+\frac{1}{2}=\pm(\tan\theta)x$.

Figure 13B:
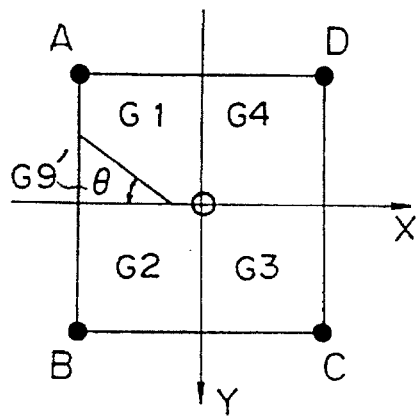

The lines dividing the unit area in the mode of FIG. 13B, are $x=0$, $y=0$, and $x-(\frac{1}{2})\cot\theta+1=+(\cot\theta)y\leq 0$.

Figure 13C:
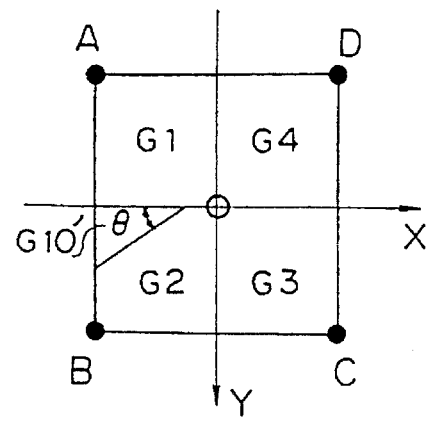

The lines dividing the unit area in the mode of FIG. 13C, are $x=0$, $y=0$, and $x-(\frac{1}{2})\cot\theta+1=-(\cot\theta)y\leq 0$.

Figure 13D:
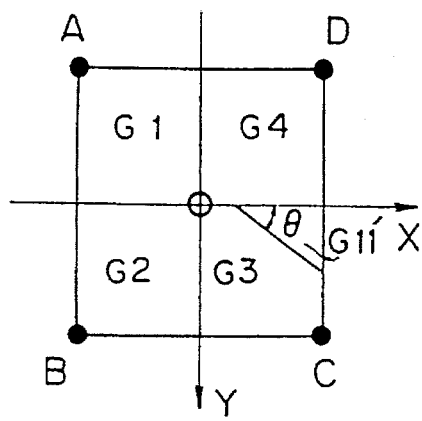
Figure 13E:
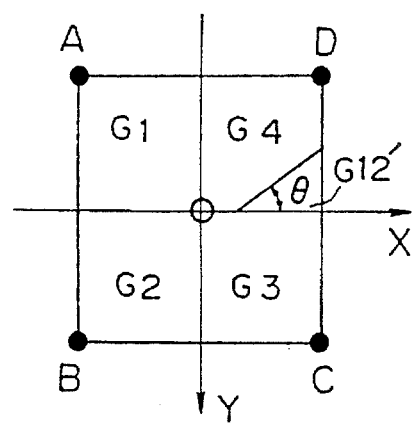

The lines dividing the unit area in the mode of FIG. 13D, are $x=0$, $y=0$, and $x+(\frac{1}{2})\cot\theta-1=+(\cot\theta)y\geq 0$; and The lines dividing the unit area in the mode of FIG. 13E, are $x=0$, $y=0$, and $x+(\frac{1}{2})\cot\theta-1=-(\cot\theta)y\geq 0$.

In FIGS. 12A, 12B, 12C, 12D, 12E, 13A, 13B, 13C, 13D, and 13D, $x=0$ corresponds to the vertical line, $y=0$ corresponds to the horizontal line, and $x=\pm\frac{1}{2}$ and $y=\pm\frac{1}{2}$ determine the boundary of the unit area.

The assignment of the values of new pixels in each of the sections G1, G2, ... G8, G9, G10, G11, G12, G9', G10', G11', and G12' in FIGS. 12A, 12B, 12C, 12D, 12E, 13A, 13B, 13B, 13C, 13D, and 13E is the same as in FIGS. 6, 7A, 7B, 7C, 7D, 7E, 8A, 8B, 8C, 8D, and 8E.

Since the line which divides the unit area determines the distribution of the values of the converted pixels, if the angle of the dividing line is much different from the angle of the original line image, unevenness having a cycle corresponding to the size of the original unit area, i.e., the original pixel density, necessarily appears in the magnified line image.

However, according to the first embodiment of the present invention, information of the angle of a line image is detected from the values of a combination of the original pixels in the predetermined vicinity of the unit area by comparing the values with a plurality of predetermined patterns. This is possible because the patterns are predetermined corresponding to portions of arrangements of pixel values, each of the arrangements constitutes a line image having a definite angle.

Then, according to the above information of the angle, a corresponding one of the predetermined modes of division is selected. The "corresponding" means that in that mode of division, the angle of a line which divides the unit area conforms to the detected angle of the original line image in the vicinity of the unit area.

Thus, the unevenness due to the difference of the angles between the line which determines the distribution of the values of the converted pixels, and the angle of the original line image, can be reduced. That is, the quality of the magnified line image is greatly improved in terms of a smoothness of oblique line images by the process of the present invention.

The process for image magnification according to the second embodiment, further comprises the following two additional steps, preceding the aforementioned first step of the present invention.

Figure 14:
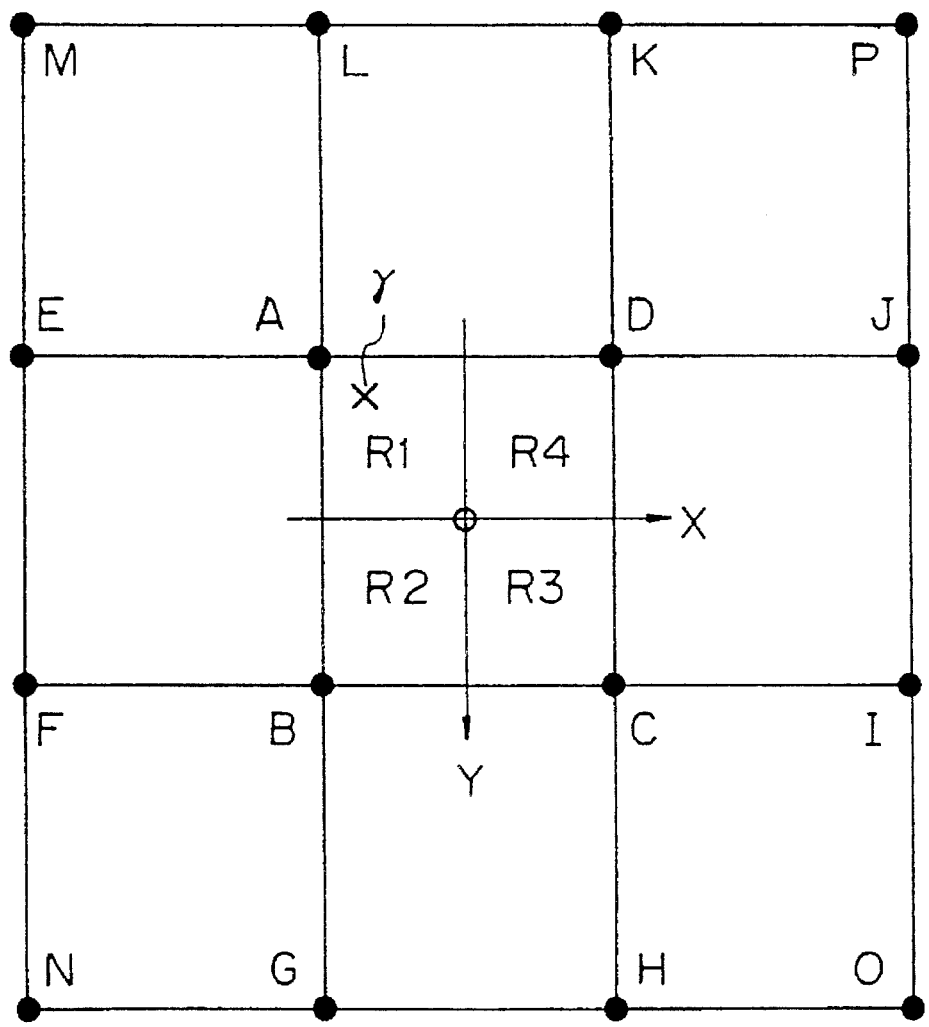
FIG. 14 is a diagram illustrating the additional steps which are carried out before the first step in the second embodiment of the present invention.

FIG. 14 shows the additional steps which are carried out before the aforementioned first step in the second embodiment of the present invention.

In the first additional step, the unit area is divided into four sub-areas R1, R2, R3, and R4, corresponding to each of the original pixel centers A, B, C, and D which are surrounding the unit area, so that all points in each sub-area are nearer to the corresponding original pixel center than to any other of the original pixel centers, i.e., the unit area is divided by the lines $x=0$ and $y=0$.

In the second additional step, a determination is carried out to determine in which of the above four sub-areas a new (converted) pixel exists.

In the second embodiment, the patterns, and the combination of original pixels, the values of which are compared with the patterns, are predetermined for each of the sub-areas. In addition, the modes of division are defined within each of the sub-areas, as explained in the following.

Figure 15:
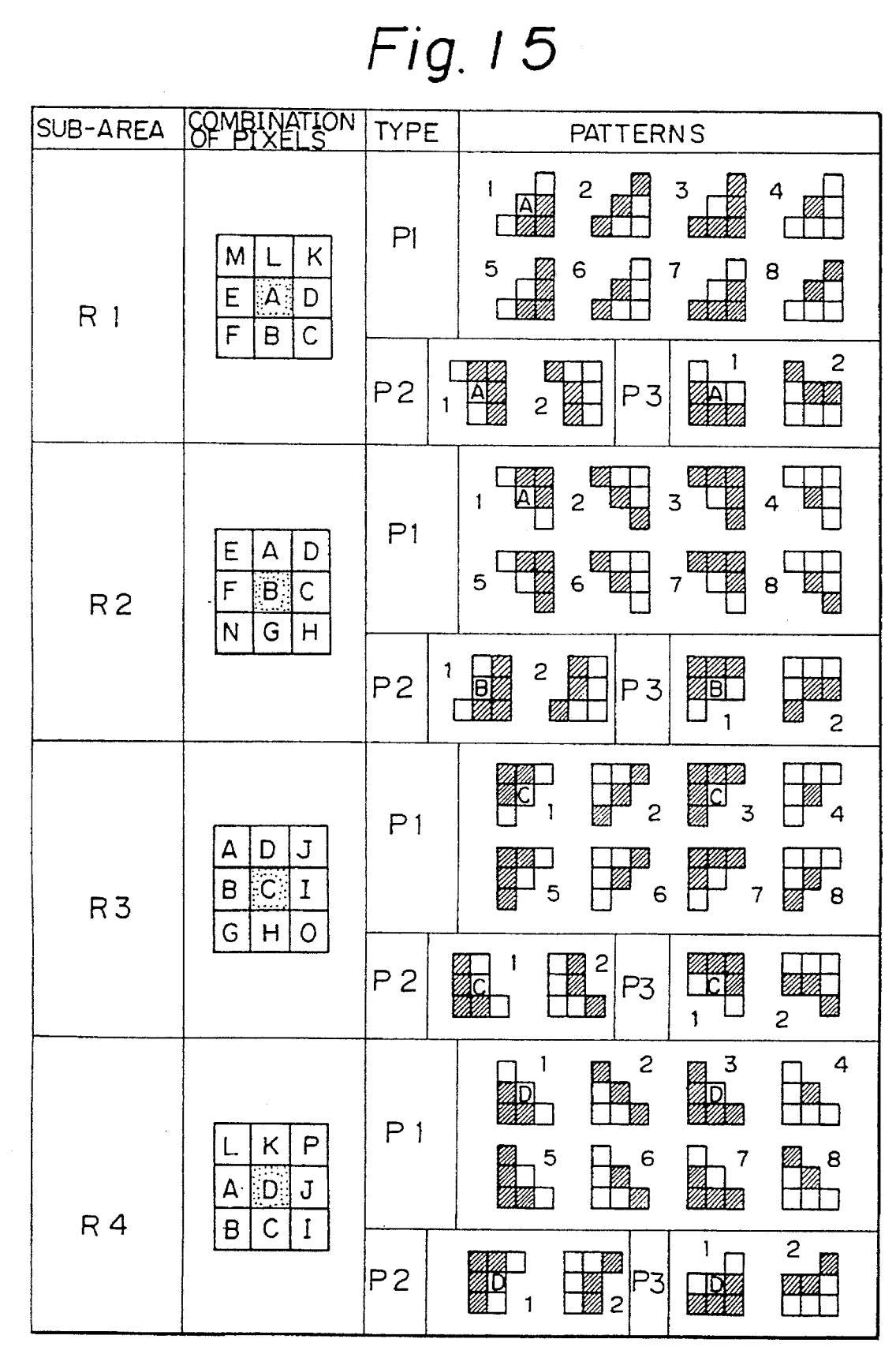

FIG. 15 shows the combinations and the patterns which are predetermined for each of the sub-areas R1, R2, R3, and R4.

The combination predetermined for each of the original pixel centers A, B, C, and D, respectively includes 3×3 original pixels arranged in a square lattice form having the corresponding corner of the unit area (the corresponding original pixel center) in its center.

Three types P1, P2, and P3 of patterns are provided for each sub-area in FIG. 15.

The type P1, P2, and P3 of patterns are provided for each sub-area in FIG. 15.

The type P1 for the sub-area R1 in FIG. 15 is the same as the patterns in the type P1 in FIG. 5 in the first embodiment of the present invention as a total (though the numberings are different in the two embodiments).

The type P1 for the sub-area R2 in FIG. 15 is the same as the patterns in the type P2 in FIG. 5 as a total (though the numberings are different in the two embodiments).

The type P1 for the sub-area R3 in FIG. 15 is the same as the patterns in the type P3 in FIG. 5 as a total (though the numberings are different in the two embodiments).

The type P1 for the sub-area R4 in FIG. 15 is the same as the patterns in the type P4 in FIG. 5 as a total (though the numberings are different in the two embodiments).

The type P2 for the sub-area R1 in FIG. 15 is the same as the patterns Nos. 1 and 2 in the type P5 in FIG. 5.

The type P2 for the sub-area R2 in FIG. 15 is the same as the patterns Nos. 1 and 2 in the type P6 in FIG. 5.

The type P2 for the sub-area R3 in FIG. 15 is the same as the patterns Nos. 3 and 4 in the type P6 in FIG. 5.

The type P2 for the sub-area R4 in FIG. 15 is the same as the patterns Nos. 3 and 4 in the type P5 in FIG. 5.

The type P3 for the sub-area R1 in FIG. 15 is the same as the patterns Nos. 1 and 2 in the type P7 in FIG. 5.

The type P3 for the sub-area R2 in FIG. 15 is the same as the patterns Nos. 3 and 4 in the type P7 in FIG. 5.

The type P3 for the sub-area R3 in FIG. 15 is the same as the patterns Nos. 3 and 4 in the type P8 in FIG. 5.

The type P3 for the sub-area R4 in FIG. 15 is the same as the patterns Nos. 1 and 2 in the type P8 in FIG. 5.

In the second embodiment, comparison of the aforementioned combination of the original pixel values with all patterns of the types P1 to P8, is equivalent to the comparison of the combination for each of the sub-areas R1, R2, R3, and R4 with the corresponding patterns of the types P1 to P3 after the determination of the sub-area. Thus, the number of the operations of comparison is reduced in the second embodiment of the present invention.

FIGS. 16A and 16B show the modes of division in the second embodiment of the present invention.

Six types M1, M2, M3, M4, M5, and M6 of the modes of division are defined for each of the sub-areas R1, R2, R3, and R4. The modes for each sub-area define divisions within the corresponding sub-area only because it is known that the new pixel center exists in that sub-area. The modes of division defined within each sub-area shown in FIG. 16 are each a part of one of the divisions shown in the first embodiment (FIGS. 6, 7A, 7B, 7C, 7D, 7E, 8A, 8B, 8B, 8C, 8D, and 8E), and the denotations of the sections G1, G2, G3, G4, G5, G6, G7, G8, G9, G10, G11, and G12, are the same as in FIGS. 6, 7A, 7B, 7C, 7D, 7E, 8A, 8B, 8B, 8C, 8D, and 8E.

As shown in FIGS. 16A and 16B, when the patterns No. 1 or 2 in the type P1 are detected for each section, the mode of division M1 is selected for that section; when the patterns No. 3 or 4 in the type P1 are detected for each section, the mode of division M2 is selected for that section; when the patterns No. 5 or 6 in the type P1 are detected for each section, the mode of division M5 is selected for that section; when the patterns No. 7 or 8 in the type P1 are detected for each section, the mode of division M6 is selected for that section; when the patterns in the type P2 are detected for each section, the mode of division M3 is selected for that section; and when the patterns in the type P3 are detected for each section, the mode of division M4 is selected for that section.

Further, in the second embodiment, when one of the patterns corresponding to a line image showing a right-angled corner is detected, a unique mode M2 for the right-angled corners only is assigned, i.e., when one of the patterns Nos. 3 and 4 in the type P1 in each sub-area is detected.

FIG. 17 shows the logical expressions for obtaining values of the new pixels the center of which exists in each of the sections. Corresponding to the above provision of the modes of division including a provision of the mode M2 for the line images showing a right-angled corner, the logical expressions for obtaining values of the new pixels in each of the sections G5, G6, G7, and G8, are simplified as shown in FIG. 17.

The third embodiment of the present invention is provided for obtaining a further sharpness in the magnified line image, particularly, where the angle of the line image changes.

Figure 18:
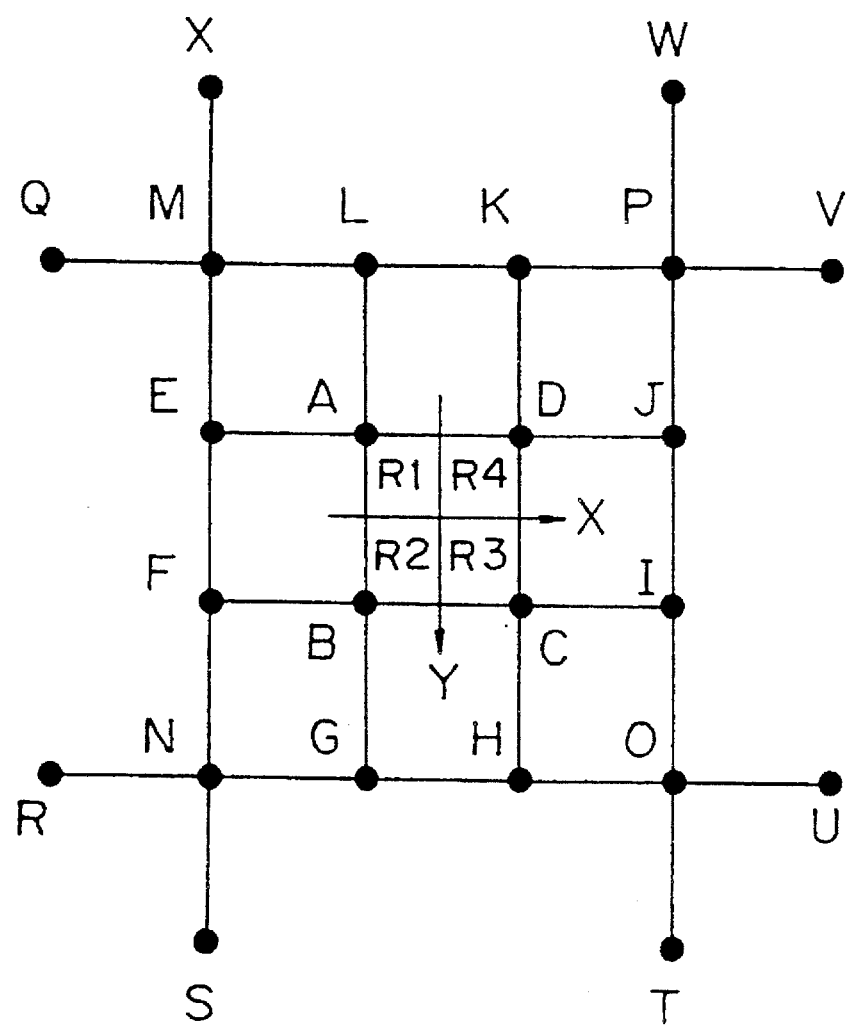
FIG. 18 is a diagram illustrating the arrangement of original pixel centers in the vicinity of the third embodiment of the present invention.

FIG. 18 shows the arrangement of original pixel centers in the vicinity of the third embodiment of the present invention. In the third embodiment, eight further original pixels Q, R, S, T, U, V, W, and X, are added into the vicinity. These additional original pixels are added outside of the aforementioned 4×4 square lattice, and two of the eight additional original pixels are abutting on each of the four original pixels which are at the corners of the 4×4 square lattice, in the vertical direction and in the horizontal direction, as shown in FIG. 18.

Similar to the second embodiment, as a first additional step, the unit area ABCD is divided into four sub-areas R1, R2, R3, and R4 corresponding to each of the original pixel centers A, B, C, and D which are surrounding the unit area, so that all points in each sub-area are nearer to the corresponding original pixel center than to any other of the original pixel centers, i.e., the unit area is divided by the lines x=0 and y=0.

As a second additional step, a determination is carried out to determine in which of the above four sub-areas a new (converted) pixel exists.

The patterns and the combination of original pixels, the values of which are compared with the patterns, are predetermined for each of the sub-areas, and the modes of division are defined within each of the sub-areas.

Figure 19A:
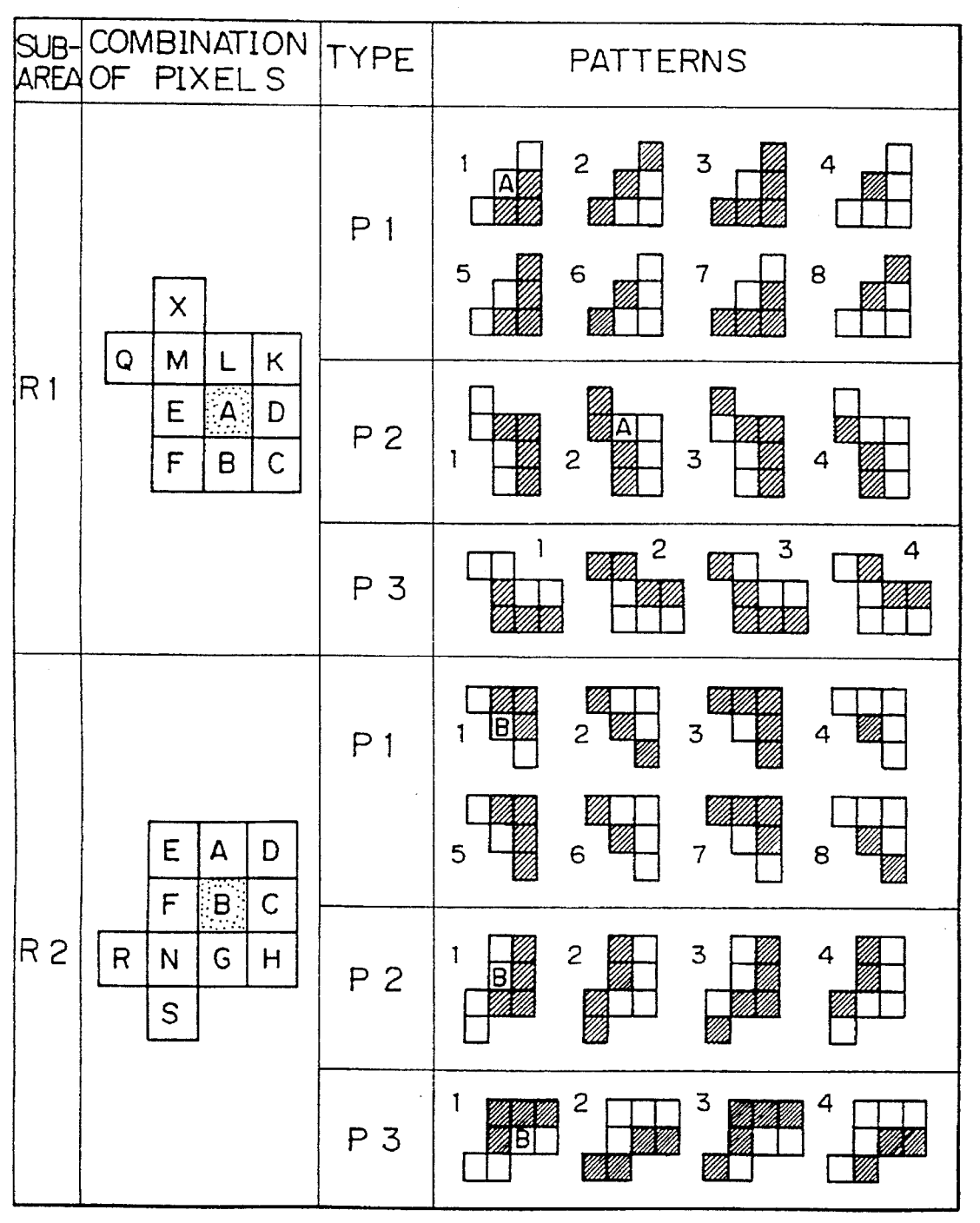
Figure 19B:

FIGS. 19A and 19B show the combinations and the patterns which are predetermined for each of the sub-areas R1, R2, R3, and R4.

The combination predetermined for the original pixel center A includes 3×3 original pixels arranged in a square lattice form having the corresponding corner A of the unit area (the corresponding original pixel center) in its center, and two additional original pixels Q and X in the far side from the unit area ABCD.

The combination predetermined for the original pixel center B includes 3×3 original pixels arranged in a square lattice form having the corresponding corner B of the unit area (the corresponding original pixel center) in its center, and two additional original pixel R and S in the far side from the unit area ABCD.

The combination predetermined for the original pixel center C includes 3×3 original pixels arranged in a square lattice form having the corresponding corner C (the corresponding original pixel center) in its center, and two additional original pixels T and U in the far side from the unit area ABCD.

The combination predetermined for the original pixel center D includes 3×3 original pixels arranged in a square lattice form having the corresponding corner D (the corresponding original pixel center) in its center, and two additional original pixels V and W in the far side from the unit area ABCD.

Three types P1, P2, and 3 of patterns are provided for each sub-area in FIGS. 19A and 19B.

The type P1 for each of the sub-areas R1, R2, R3, and R4 shown in FIGS. 19A and 19B is the same as the corresponding patterns in the type P1 in FIG. 15 in the second embodiment of the present invention.

The patterns of the types of P2 and P3 provides the characteristics of the third embodiment of the present invention.

The patterns Nos. 1 and 2 in the type P2 for each of the sub-areas R1, R2, R3, and R4, correspond to the line images at the angles $\pm\tan^{-1}2$ without a change of the angle, and the patterns Nos. 3 and 4 in the type P2 for each of the sub-areas R1, R2, R3, and R4, correspond to the line images which are changing its slope between $\pm\tan^{-1}1$ (45 degrees) and $\pm\tan^{-1}2$, or between $\pm\tan^{-1}1$ (45 degrees) and 90 degrees.

The patterns Nos. 1 and 2 in the type P3 for each of the sub-areas R1, R2, R3, and R4, correspond to the line images at the angles $\pm\tan^{-1}1/2$ without a change of the angle, and the patterns Nos. 3 and 4 in the type P3 for each of the sub-areas R1, R2, R3, and R4, correspond to the line images which are changing their slope between $\pm\tan^{-1}1$ (45 degrees) and $\pm\tan^{-1}2$, or between $\pm\tan^{-1}1$ (45 degrees) and 0 degrees.

The detection of these angle changing points in line images is possible due to the above-mentioned additional eight original pixels. Even so, the modes of division provided are completely the same as the modes shown in FIGS. 16A and 16B.

When the above pattern No. 3 or 4 in the types P2 or P3 is detected, generally, there is an option in selecting a mode. However, in this embodiment, if the above pattern No. 3 or 4 in the type P2 or P3 is detected, the mode M1 corresponding to the angle ±45 degrees is selected for each of the sub-areas R1, R2, R3, and R4, to show a sharp angle change in the magnified image. The reason for the selection is as follows.

Suppose that a sharp angle change between 90 degrees to 45 degrees occurs at a point in a line shape. Under this condition, if the aforementioned second embodiment of the present invention using the patterns shown in FIG. 15 is applied, it is deemed that a pattern corresponding to $\tan^{-1}2$ is detected at the above point, and then a mode of division corresponding to $\tan^{-1}2$ is applied. Therefore, a portion of a line image where actually a sharp angle change occurs is blunted by the magnification.

Further, under this condition, when the above-mentioned third embodiment of the present invention using the patterns shown in FIGS. 19a and 19B is applied, for example, the pattern No. 3 in the type P2 is detected. Then, if it is deemed that the detection of the pattern No. 3 in the type P2 shows a line image which is changing its slope between $\pm\tan^{-1}1$ (45 degrees) and $\pm\tan^{-1}2$, and the mode of division corresponding to the angles $\pm\tan^{-1}2$ is selected, the magnification result at the angle changing portion is the same as the above result by the second embodiment of the present invention, i.e., no effect appears by the addition of the eight original pixels in the third embodiment of the present invention.

Therefore, the third embodiment of the present invention is effective only when the mode M1 corresponding to the angle ±45 degrees is selected for the detection of one of the patterns Nos. 3 and 4 in the types P2 and P3, for each of the sub-areas R1, R2, R3, and R4. According to this selection, an image of a sharp angle change between 90 degrees to 45 degrees or between 0 degrees to 45 degrees is maintained even after the magnification.

Figure 20:
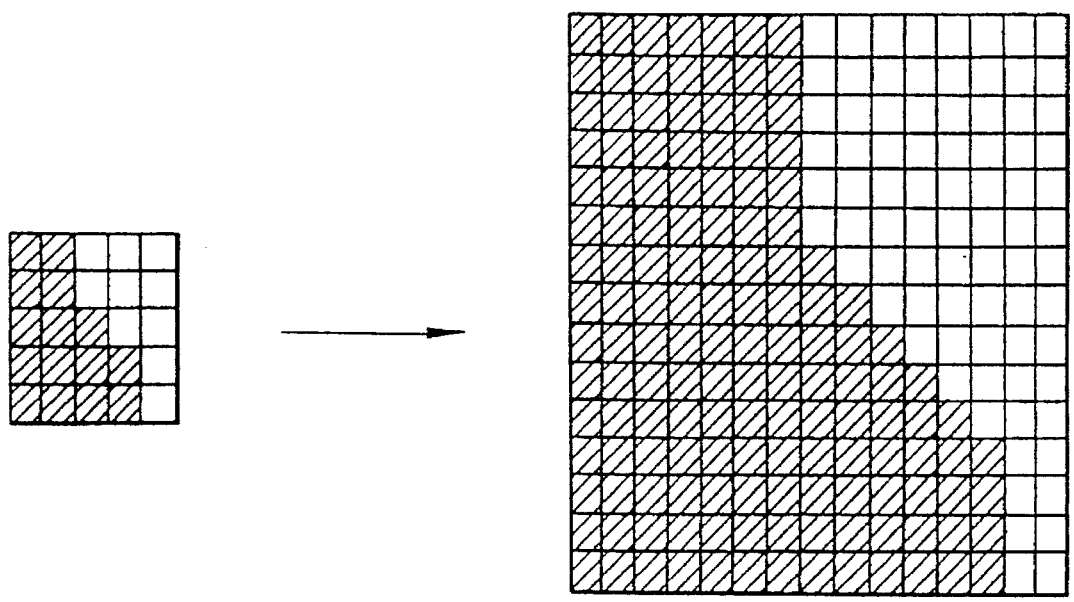
FIGS. 20A and 20B are diagrams illustrating two examples of the magnification of the above sharp angle changes between 90 degrees to 45 degrees and between 0 degrees to 45 degrees.
Figure 20B:
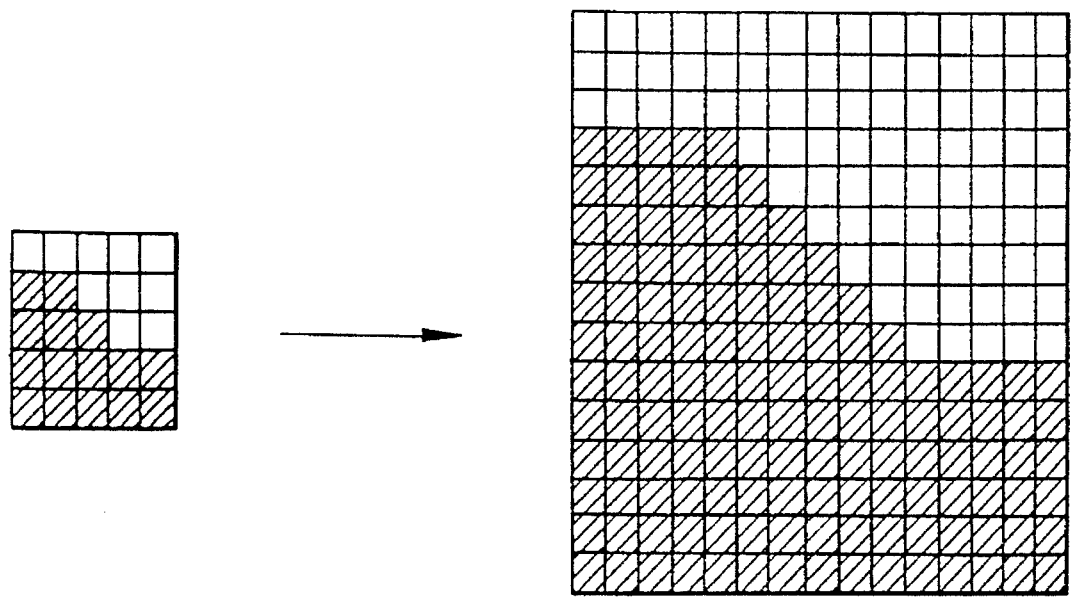
Figure 21:
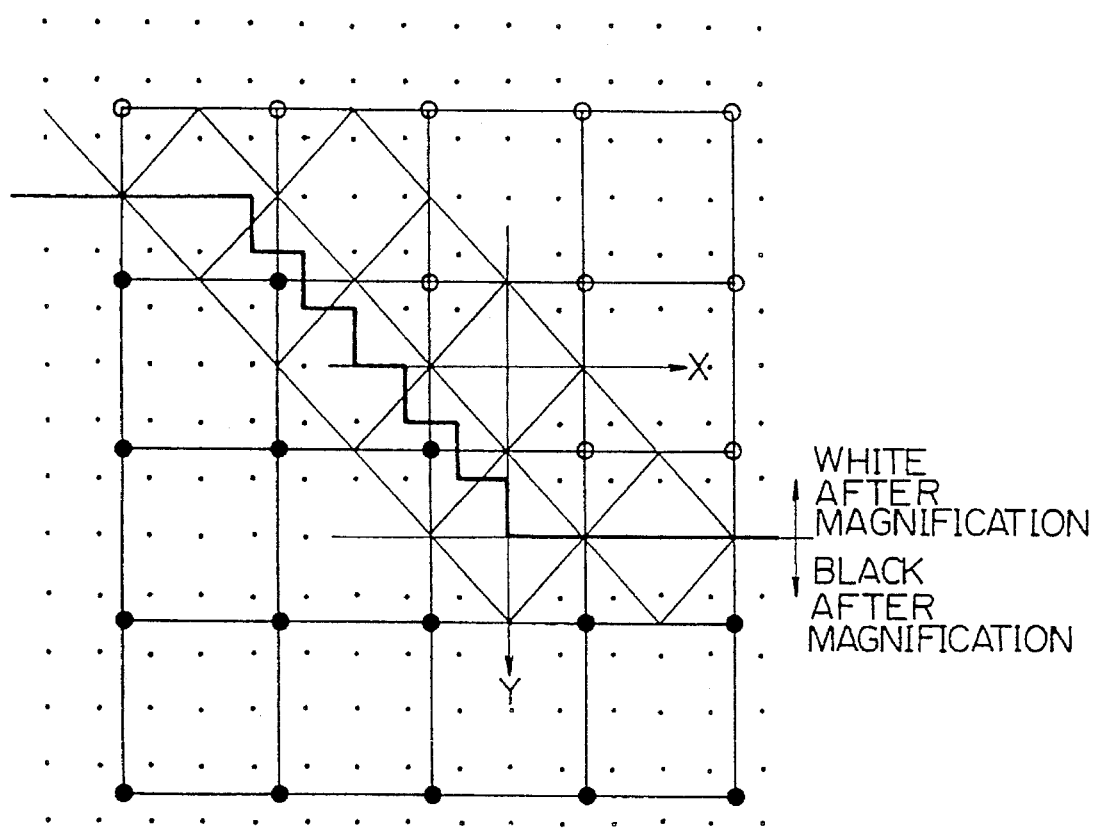
FIG. 21 is a diagram illustrating a detail of the magnification process of the image shown in FIG. 20B.

FIGS. 20A and 20B show two examples of the magnification of the above sharp angle changes between 90 degrees to 45 degrees and between 0 degrees to 45 degrees, and FIG. 21 shows a detail of the magnification process of the image shown in FIG. 20B.

Figure 22:
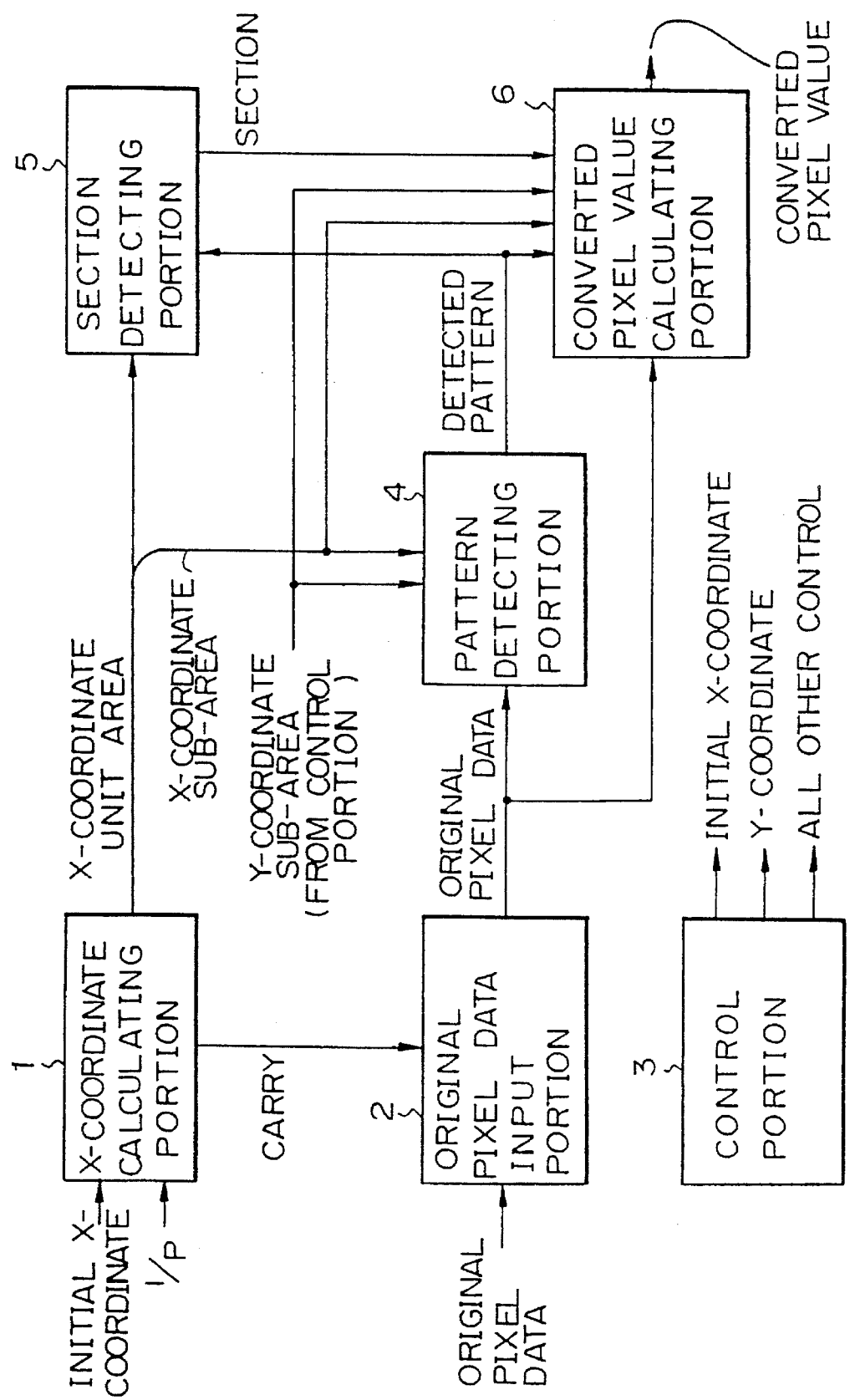
FIG. 22 is a block diagram of an embodiment of the apparatus for image magnification according to the present invention.

FIG. 22 shows a block diagram of an embodiment of the apparatus for image magnification according to the present invention. The apparatus of FIG. 22 carries out the process of the aforementioned second embodiment.

In FIG. 22, reference numeral 1 denotes an x-coordinate calculating portion, 2 denotes an original pixel data input portion, 3 denotes a control portion, 4 denotes a pattern detecting portion, 5 denotes a section detecting portion, and 6 denotes a converted pixel value calculating portion.

The x-coordinate calculating portion 1 receives an inverse 1/p of the magnification rate p in x direction and the initial x-coordinate of the converted pixel, calculates the x-coordinate of each converted pixel by adding the inverse 1/p to the x-coordinate of the preceding converted pixel, and then outputs the x-coordinate of the new converted pixel.

In the construction of FIG. 22, the interval between two adjacent original pixels in both the x direction and the y direction are each supposed to be one. That is, the size of the aforementioned unit area is one.

When the x-coordinate output of the x-coordinate calculating portion 1 passes over another size of the unit area, the integer portion of the x-coordinate output is applied to the original pixel data input portion 2 as a carry signal.

The decimal portion of the above x-coordinate output is applied to the section detecting portion 5, and the most significant bit of the decimal portion of the above x-coordinate output is applied to the pattern detecting portion 4. The most significant bit of the decimal portion of the above x-coordinate output includes information on the sub-areas (quadrants) where the center of the converted pixel exists. That is, the most significant bit indicates whether the center of the converted pixel exists in R1, R2 side or R3, R4 side in the unit area shown in FIG. 14.

The original pixel data input portion 2 receives three lines of the original pixel data for a predetermined interval. Each line corresponds to a row of the original pixels in the same y-coordinate, and the three adjacent lines are input into the original pixel data input portion 2 at the same time.

These three lines correspond to the three lines in the aforementioned 3×3 square lattice form of the combination of the original pixels as shown in FIG. 15, and the original pixel data input portion 2 prepares a set of four bits data consisting of four original pixels adjacent each other in x direction for each of the three lines. The four original pixels in the three lines correspond to the four original pixels in three adjacent lines in the four lines (M, L, K, P), (E, A, D, J), (F, B, C, I), and (N, G, H, O), in 4×4 square lattice form shown in FIG. 14.

The output (prepared data) of the original pixel data input portion 2 in each of the above three lines is shifted by one bit in x direction when the above-mentioned carry signal is applied to the original pixel data input portion 2. The output of the original pixel data input portion 2 is applied to both the pattern detecting portion 4 and the converted pixel value calculating portion 6.

The pattern detecting portion 4 holds a plurality of predetermined patterns of the pixel data arrangement as shown in FIG. 15, and receives information on the sub-areas (quadrants) where the center of the converted pixel exists, i.e., information showing whether the center of the converted pixel exists in the R1, R2 side or the R3, R4 side in the unit area shown in FIG. 14, from the x-coordinate calculating portion 1, and information showing whether the center of the converted pixel exists in the R2, R3 side or the R1, R4 side, from the control portion 3, and the set of four bit data for each of the three lines from the original pixel data input portion 2. Then, the pattern detecting portion 4 detects a pattern which is equal to the pattern consisting of the values of the aforementioned combination of the original pixels, among the above predetermined patterns, by comparing the pattern consisting of the values of the combination with each of the aforementioned predetermined patterns.

The section detecting portion 5 holds a set of the x-coordinates of the dividing lines at the y-coordinate of converted pixels. The dividing lines include lines for all modes of division, and each of the lines devides a unit area (sub-area) into sections according to the corresponding mode of division as shown in FIGS. 16A and 16B.

The mode of division is selected according to the pattern which is detected in the pattern detecting portion 4.

The section detecting portion 5 compares the x-coordinate of each converted pixel with the x-coordinates of the dividing lines for the selected mode mentioned above, and detects whether or not the x-coordinate of each converted pixel is larger than the x-coordinates of the dividing lines for the selected mode. Thus, the section detecting portion 5 can show the section where the coordinate of the converted pixel exists when the mode selected is known.

The converted pixel value calculating portion 6 receives the above output of the section detecting portion 5, the pattern which is detected in the pattern detecting portion 4, the information on the sub-areas where the center of the converted pixel exists, and the set of original pixel data which is output from the original pixel data input portion 2, and then carries out the logical calculation as shown in FIG. 17 to obtain the value for the converted pixel.

The control portion 3 controls all operation of the construction of FIG. 22, including supplying of the initial x-coordinate, (the inverse of) the magnification rate p, and the information on whether the center of the converted pixel exists in the R2, R3 side or the R1, R4 side in a unit area.

Figure 23A:
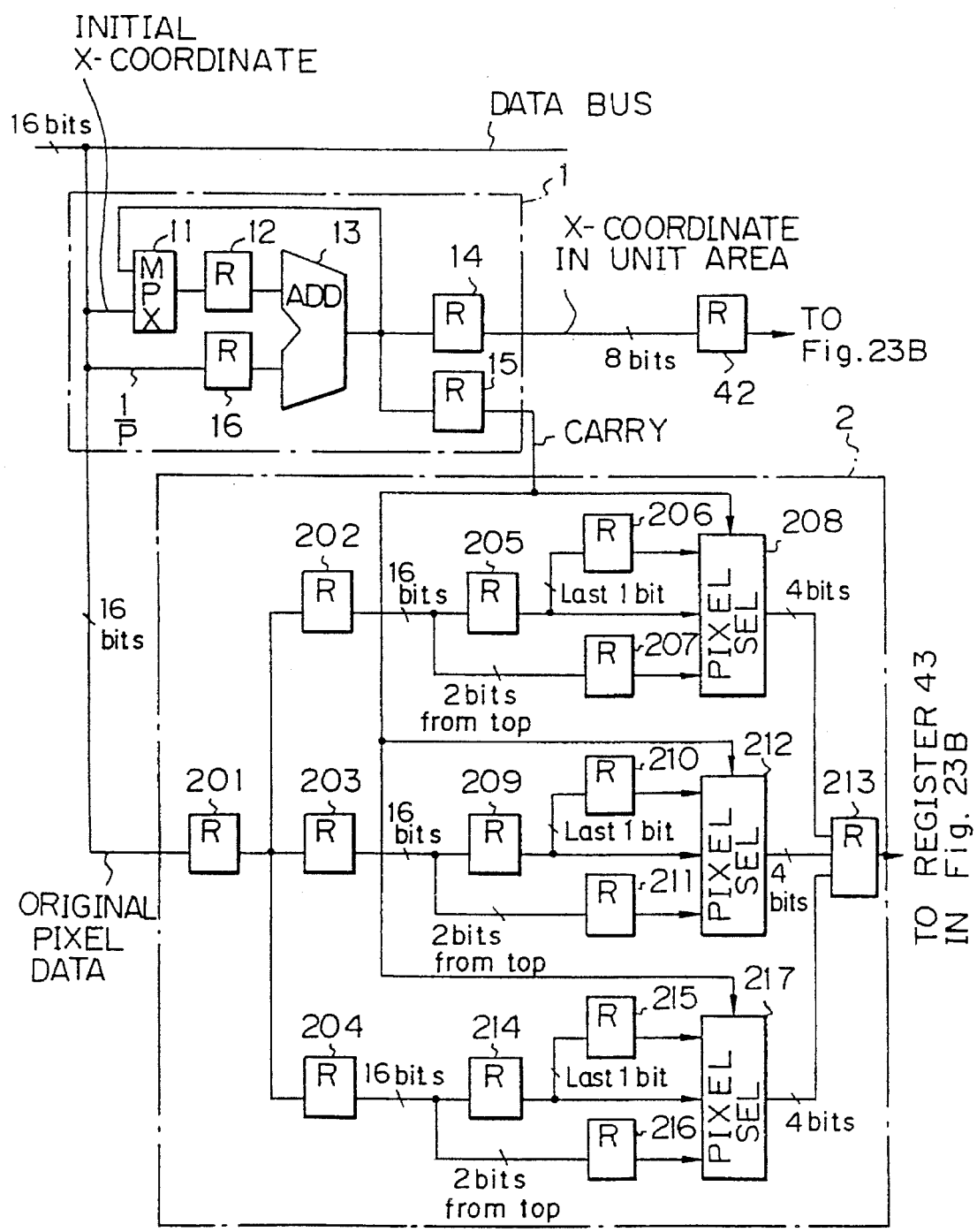
FIG. 23A is a block diagram of an example of the construction of the x-coordinate calculating portion 1 and the original pixel data input portion 2 in FIG. 22.

FIG. 23A shows an example of the construction of the x-coordinate calculating portion 1 and the original pixel data input portion 2 in FIG. 22.

The construction shown in the dashed line 2 in FIG. 23A, corresponds to the original pixel data input portion 2 in FIG. 22, and is constructed by registers 201, 202, 203, 204, 205, 206, 207, 209, 210, 211, 213, 214, 215, and 216, and pixel select circuits 208, 212, and 217.

The construction shown in the dashed line 1 in FIG. 23A, corresponds to the x-coordinate calculating portion 1 in FIG. 22, and is constructed by a multiplexer 11, registers 12, 14, 15, and 16, and an adder 13.

Before starting the process the initial x-coordinate of the converted pixel is applied to one of the input terminal of the multiplexer 11, and then that input is selected. As a result, the initial x-coordinate of the converted pixel is input into the register 12. On the other hand, the inverse 1/p of the magnification rate (in x direction) p is input into the register 16 as a pitch of the x-coordinate of the converted pixel.

Each of the pixel select circuits 208, 212, and 217 in the construction shown in the dashed line 2 in FIG. 23A selects a set of four adjacent original pixels in the corresponding line of the original pixels. Each of three adjacent lines of the original pixel data is supplied to the corresponding one of the pixel select circuits 208, 212, and 217.

The registers 205, 206, and 207 supply the original pixel data in the first line to the pixel select circuit 208, the registers 209, 210, and 211 supplies the original pixel data in the second line to the pixel select circuit 212, and the registers 214, 215, and 216 supplies the original pixel data in the third line to the pixel select circuit 217.

Each of the registers 205, 209, 214 hold sixteen bits of the original pixel data until the operation of the corresponding one of the pixel select circuits 208, 212, and 217 using the sixteen bits of the original pixel data is completed. At the same time, each of the registers 206, 210, and 215 hold a last one bit of the preceding sixteen bits of the original pixel data, which preceding sixteen bits were held in the corresponding one of the registers 205, 209, and 214 for the preceding cycle of operation. Each of the registers 207, 211, and 216 holds two bits from the top of the next sixteen bits of the original pixel data, which next sixteen bits is to be held in the corresponding one of the registers 205, 209, and 214 for the next cycle of operation.

The last one bit in the preceding sixteen bits of data held in each of the registers 206, 210, and 215 and the two bits from the top in the next sixteen bits of data held in each of the registers 207, 211, and 216 are used for realizing a continuous preparation of a set of four bits (data of pixels) data from the input data which are supplied and renewed by sixteen bits (data of pixels).

The content of each of the registers 205, 209, and 214 is renewed by the content of the corresponding one of the registers 202, 203, and 204 when the operations of the pixel select circuits 208, 212, and 217 using the corresponding sixteen bits of the original pixel data is completed. After the contents of the registers 202, 203, and 204 are each written into the corresponding one of the registers 205, 209, and 214, the contents of the registers 202, 203, and 204 are each renewed through the register 201 under the control of the control portion 3.

The output of each of the pixel select circuits 208, 212, and 217, i.e., each set of four bits data of the adjacent four original pixels, are once held in the register 213 and then are output as the aforementioned output of the original pixel data input portion 2.

Figure 23B:
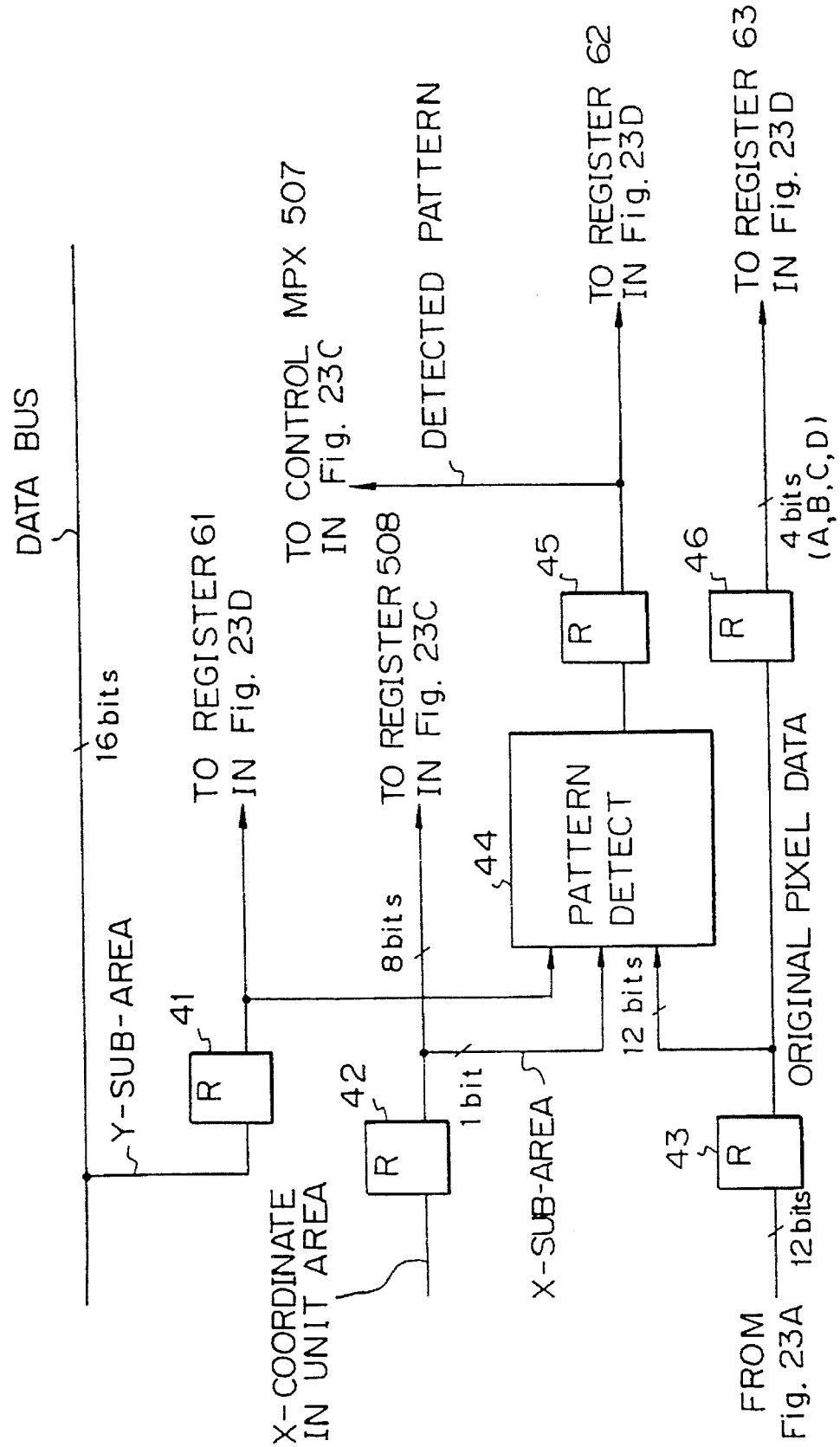
FIG. 23B is a block diagram of an example of the construction of the pattern detecting portion 4 in FIG. 22.

FIG. 23B shows an example of the construction of the pattern detecting portion 4 in FIG. 22.

The pattern detecting portion shown in FIG. 23B, is constructed by registers 41, 42, 43, 45 and 46, and a pattern detecting circuit 44.

Before starting the operation for converted pixels in a new line, i.e., when a y-coordinate of converted pixels in a line is renewed, the most significant bit of the decimal portion of the y-coordinate of the converted pixels in the line is input into the register 41. This value gives information on the sub-area where the center of the converted pixel exists. That is, the output of the register 41 shows whether the converted pixel is in the side of the sub-areas R1 and R4, or in the side of the sub-areas R2 and R3 in the division of a unit area shown in FIG. 14. The y-coordinate of the converted pixels in each line is calculated in the control portion shown in FIG. 22, and the above most significant bit is input into the register 41 under the control of the control portion 3.

The aforementioned decimal portion of the x-coordinate output of the x-coordinate calculating portion 1 is once input into the register 42, and then the most significant bit of the decimal portion of the x-coordinate is applied to the pattern detecting circuit 44, together with the above-mentioned most significant bit of the decimal portion of the y-coordinate of the converted pixels in the line. The most significant bit of the decimal portion of the above x-coordinate output includes the information on the sub-area where the center of the converted pixel exists.

The register 43 receives the output of the original pixel data input portion 2, i.e., the three lines of four adjacent original pixel data.

The pattern detecting circuit 44 holds a plurality of predetermined patterns of the pixel data arrangement as shown in FIG. 15, and receives the aforementioned information on the sub-area where the center of converted pixel exists, and the set of four bit data for each of the three lines from the original pixel data input portion 2. Then, the pattern detecting circuit 44 detects one pattern which is equal to a pattern consisting of the values of the aforementioned combination of the original pixels, among the above-mentioned predetermined patterns, by comparing the pattern consisting of the values of the combination with each of the predetermined patterns.

Figure 23C:
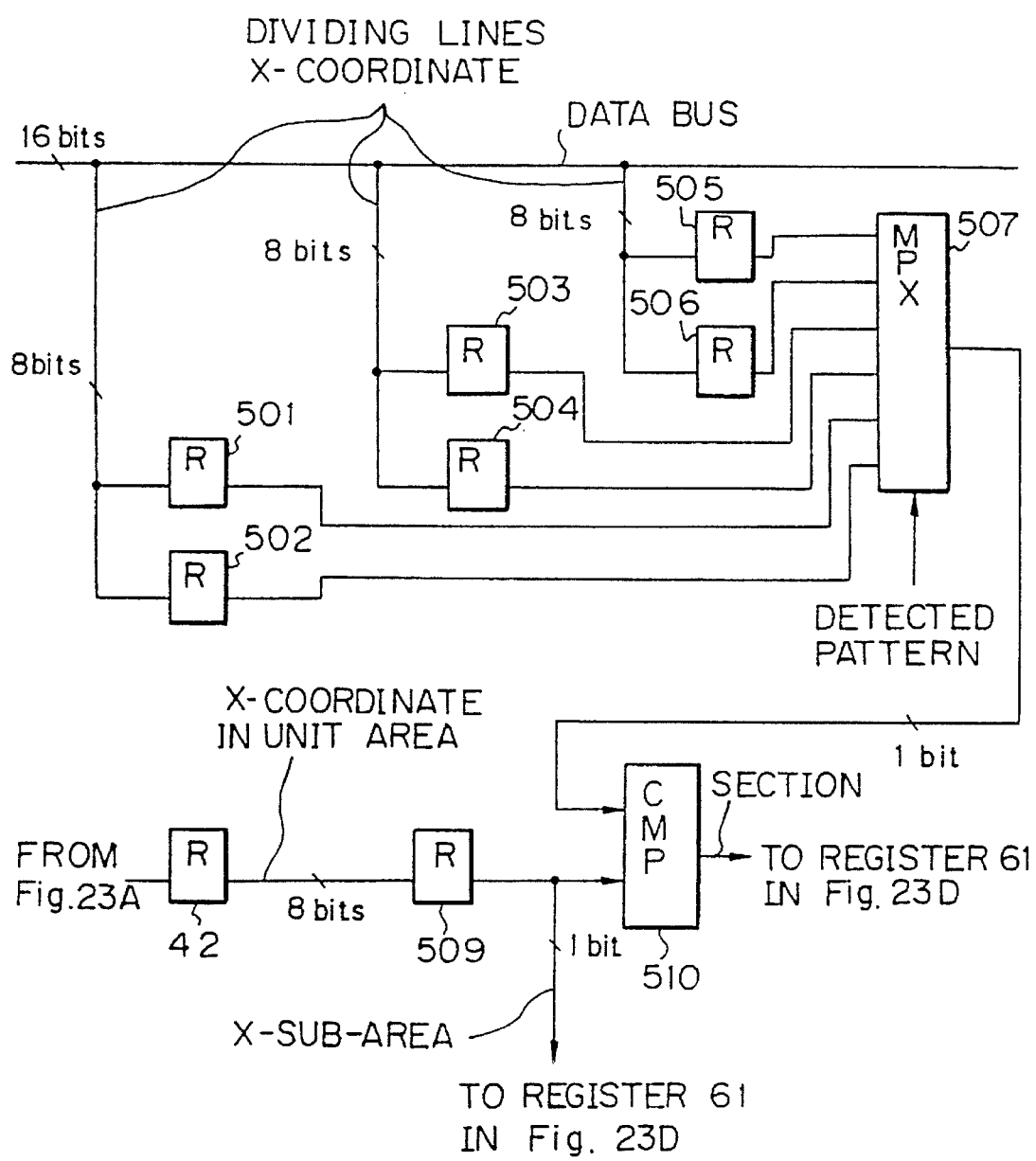
FIG. 23C is a block diagram of an example of the construction of the section detecting portion 5 in FIG. 22.

The output of the pattern detecting circuit 44 is applied through the register 45 to the multiplexer 507 in FIG. 23C as a control signal, and is also applied through the register 45 to the register 62 in FIG. 23D.

FIG. 23C shows an example of the construction of the section detecting portion 5 in FIG. 22.

The section detecting portion shown in FIG. 23C, is constructed by registers 501, 502, 503, 504, 505, 506, and 509, and a multiplexer 507, and a comparator 510.

Figure 24:
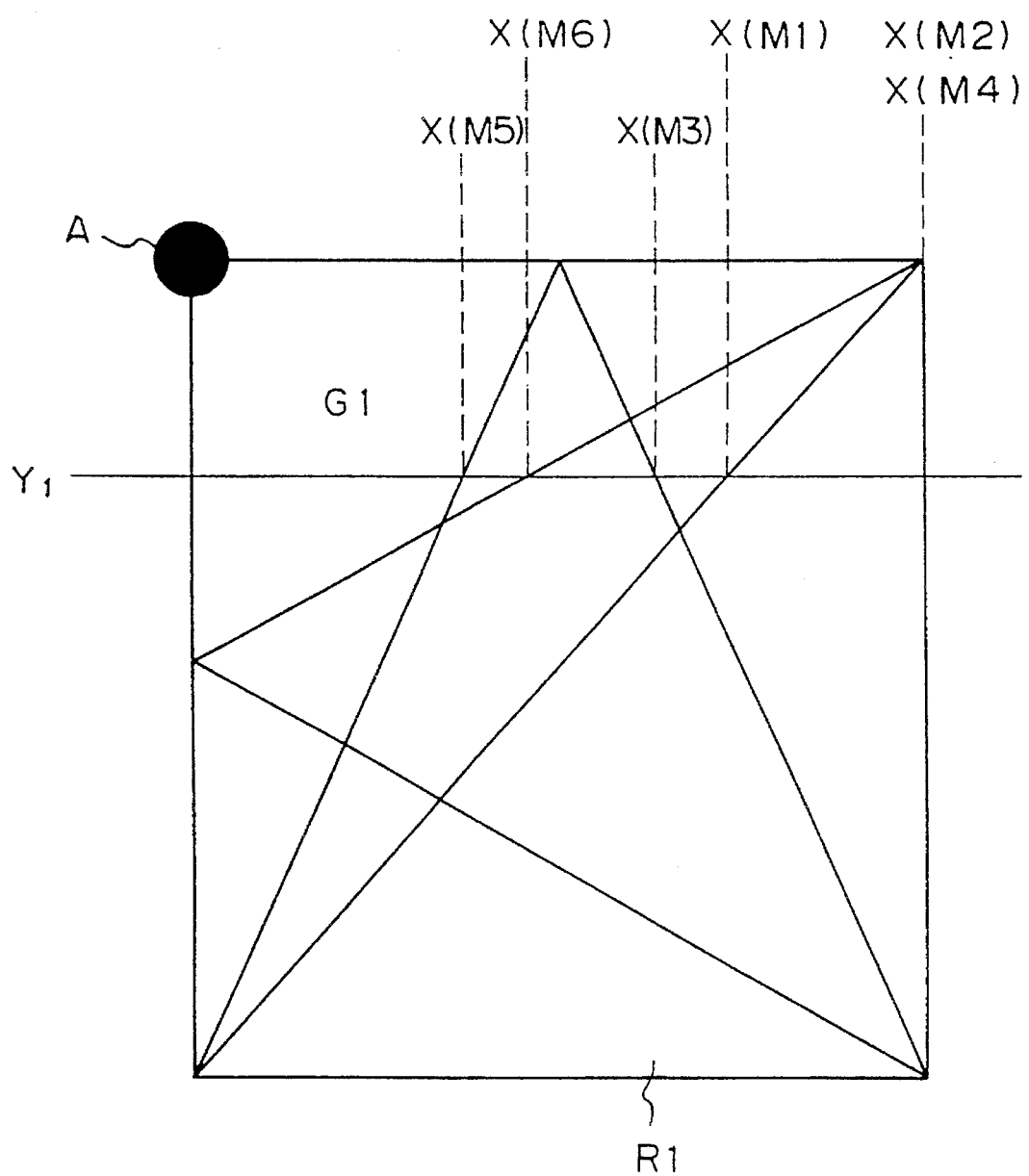
FIG. 24 is a diagram illustrating the x-coordinates X(M1), X(M2), X(M3), X(M4), X(M5), and X(M6) of the dividing lines in all modes of division M1, M2, M3, M4, M5, and M6 (FIG. 16A), at the y-coordinate $Y_1$ of the converted pixel, when the center of the converted pixel exists in the sub-area R1.

A set of the x-coordinates of the dividing lines at the y-coordinate of the converted pixel, are each input into the corresponding one of the registers 501, 502, 503, 504, 505, and 506. For example, FIG. 24 shows the x-coordinates X(M1), X(M2), X(M3), X(M4), X(M5), and X(M6) of the dividing lines in all modes of division M1, M2, M3, M4, M5, and M6 (FIG. 16A), at the y-coordinate $Y_1$ of the converted pixel, when the center of the converted pixel exists in the sub-area R1.

Then, the above x-coordinates X(M1), X(M2), X(M3), X(M4), X(M5), and X(M6) of the dividing lines in all modes of division M1, M2, M3, M4, M5, and M6 are applied to the multiplexer 507, and the multiplexer 507 selects one x-coordinates X(Mi) for one of the modes of division according to the pattern which is detected in the pattern detecting circuit 44 and is applied to the multiplexer 507 as a control signal.

The selected output of the multiplexer 507 is applied to one input terminal of the comparator 510. The decimal portion of the x-coordinate (x-coordinate in a unit area) is applied through the registers 42 and 509 to the other input terminal of the comparator 510. For example, the output of the comparator 510 is "0" before the x-coordinate passes over the corresponding dividing line, and "1" after it passed over. Therefore, the output of the comparator 510 indicates in which section between two sections divided by the dividing line in the selected mode the coordinate of the converted pixel exists.

FIG. 23D shows an example of the construction of the converted pixel value calculating portion 6 in FIG. 22.

The converted pixel value calculating portion shown in FIG. 23D, is constructed by registers 61, 62, 63, and 66, and a logic arithmetic circuit 64, and a shift register 65.

The logic arithmetic circuit 64 receives: the above output of the comparator 510 and the information on the sub-area where the center of the converted pixel exists, through the register 61; the pattern detected in the pattern detecting circuit 44 through the register 62; and four bits A, B, C, and D in the three lines of the four adjacent bits from the original pixel data input portion 2 through the register 63. Then, the logic arithmetic circuit 64 calculates and outputs the value shown in FIG. 17 according to the information on the sub-area, the detected pattern, the section where the converted pixel exists, and the values of the original pixels A, B, C, and D. Thus, the value of each converted pixel can be obtained.

Although the apparatus for image magnification explained above carries out the process of the aforementioned second embodiment of the present invention, it is readily understood that apparatuses carrying out the process according to the first and third embodiments of the present invention can be constructed similarly.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

I claim:

1. A process for determining values of new pixels which are to be interpolated in a unit area which is determined by four pixel centers of an original image on a display screen, and which has the four pixel centers at four corners thereof, respectively, for magnifying an image consisting of original pixels on the display screen, comprising the steps of:

(a) storing, in a plurality of registers, coordinates of a set of division lines uniquely defining a plurality of modes of division of the unit area, respectively, where, in each of the modes, the unit area is divided into sections by one of the division lines corresponding to each of the modes;

(b) detecting an angle of an original line image on the display screen in a predetermined vicinity of the unit area by comparing values of a combination of original pixels in the predetermined vicinity of the unit area with each of a plurality of predetermined patterns of an arrangement of pixel values, where the detected angle is digitized to one of a plurality of original line angles;

(c) selecting one of a plurality of predetermined modes of division of the unit area so that an angle of one of the division lines of the selected mode of division conforms to the original line angle detected in step (b);

(d) determining a value for each of the new pixels by assigning a value, determined based on the values of the original pixels in the predetermined vicinity, to all of the new pixels having centers in one of the sections of the unit area generated by the mode of division selected in step (c); and (e) modifying the original image on the display screen to produce a picture image using the values of the original pixels and the values of the new pixels generated in steps (a)–(d), the predetermined patterns including patterns which respectively correspond to a plurality of different portions of line images in a plurality of predetermined angles, the plurality of original line angles including 0 degrees, 90 degrees, $\pm\tan^{-1} 1$, $\pm\theta$, and $\pm(\pi/2-\theta)$, $\theta$ being one of $(\tan^{-1}1<\theta<\tan^{-1}2)$ and $(\tan^{-1}1/2<\theta<\tan^{-1}1)$, each of the plurality of predetermined modes of division including division lines for dividing the unit area into sections, and said selecting in step (c) selecting one of the plurality of predetermined modes of division including:

a first mode having the division lines determined by $x=0$, $y=0$, $x\pm y=\frac{1}{2}$, and $x\pm y=-\frac{1}{2}$;

a second mode having the division lines determined by $x=0$, $y=0$, $y=\pm(\tan \theta)(x-\frac{1}{2})$, and $y=\pm(\tan \theta)(x+\frac{1}{2})$;

a third mode having the division lines determined by $x=0$, $y=0$, $y-\frac{1}{2}=\pm(\tan \theta)x$, and $y+\frac{1}{2}=\pm(\tan \theta)x$;

a fourth mode having the division lines determined by $x=0$, $y=0$, and $y+1-(\frac{1}{2})\tan \theta=+(\tan \theta)x\leq 0$;

a fifth mode having the division lines determined by $x=0$, $y=0$, and $y-1+(\frac{1}{2})\tan \theta=-(\tan \theta)x\geq 0$;

a sixth mode having the division lines determined by $x=0$, $y=0$, and $y-1+(\frac{1}{2})\tan \theta=+(\tan \theta)x\geq 0$;

a seventh mode having the division lines determined by $x=0$, $y=0$, and $y+1-(\frac{1}{2})\tan \theta=-(\tan \theta)x\leq 0$;

an eighth mode having the division lines determined by $x=0$, $y=0$, and $x-(\frac{1}{2})\cot \theta+1=+(\cot \theta)y\leq 0$;

a ninth mode having the division lines determined by $x=0$, $y=0$, and $x-(\frac{1}{2})\cot \theta+1=-(\cot \theta)y\leq 0$;

a tenth mode having the division lines determined by $x=0$, $y=0$, and $x+(\frac{1}{2})\cot \theta-1=+(\cot \theta)y\geq 0$; and an eleventh mode having the division lines determined by $x=0$, $y=0$, and $x+(\frac{1}{2})\cot \theta-1=-(\cot \theta)y\geq 0$;

where x=0 corresponds to a vertical line, y=0 corresponds to a horizontal line, and x=±½ and y=±½ determine the boundary of the unit area.

2. A process according to claim 1, wherein said determining in step (d) assigns the value of the new pixels in each of the sections having boundaries including, a first section the boundaries of which include both x=0 and y+1−(½)tan θ=+(tan θ)x≤0, a second section the boundaries of which include both x=0 and y−1+(½)tan θ=[−(tan θ)X]−(tan θ)x≥0, a third section the boundaries of which include both x=0 and y−1+(½)tan θ=+(tan θ)x≥0, a fourth section the boundaries of which include both x=0 and y+1−(½) tan θ=−(tan θ)x≤0, a fifth section the boundaries of which include both y=0, and x−(½)cot θ+1=+(cot θ)y≤0, a sixth section the boundaries of which include both y=0, and x−(½)cot θ+1=−(cot θ)y≤0, a seventh section the boundaries of which include both y=0, and x+(½)cot θ−1=+(cot θ)y≥0, and an eighth section the boundaries of which include both y=0, and x+(½)cot θ−1=−(cot θ)y≥0, as an inverse of the value of the original pixel the center of which is at the corner of the unit area of the display screen nearest to each of the respective sections.

3. A process according to claim 2, wherein the value of the new pixels in each of the sections of the display screen having the boundaries which include both x=0 and y=0 in the first to third modes of division is equal to A*(B+C+D+$\overline{F*K}$)+B*C*D*($\overline{F+K}$), wherein A is a value of the original pixel the center of which is at the corner which is nearest to each section, B, C, and D are the values of the original pixels corresponding to the other three original pixels the center of which are at the other three corners of the unit area of the display screen, and F and K are each the value of one of the original pixels included in the predetermined vicinity, the centers of the original pixels F and K are ends of a hypotenuse of a right-angled equilateral triangle wherein the right angle of the right-angled equilateral is formed by the centers of he original pixels B, C, and D, and the hypotenuse includes the original pixel A in the middle.

4. A process for determining values of new pixels which are to be interpolated in a unit area which is determined by four pixel centers of an original image on a display screen, and which has the four pixel centers at four corners thereof, respectively, for magnifying an image consisting of original pixels on the display screen, comprising the steps of:

(a) storing, in a plurality of registers, coordinates of a set of division lines uniquely defining a plurality of modes of division of the unit area, respectively, wherein, in each of the modes, the unit area is divided into sections by one of the division lines corresponding to each of the modes;

(b) detecting an angle of an original line image in a predetermined vicinity of the unit area by comparing values of a combination of original pixels in the predetermined vicinity of the unit area with each of a plurality of predetermined patterns of an arrangement of pixel values, where the detected angle is digitized to one of a plurality of original line angles;

(c) selecting one of a plurality of predetermined modes of division of the unit area so that an angle of one of the division lines of the selected mode of division conforms to the original line angle detected in step (b);

(d) determining a value for each of the new pixels by assigning a value, determined based on the values of the original pixels in the predetermined vicinity, to all of the new pixels having centers in one of the sections of the unit area generated by the mode of division selected in step (c); and (e) modifying the original image on the display screen to produce a picture image using the values of the original pixels and the values of the new pixels generated in steps (a)–(d), the plurality of original line angles including 0 degrees, 90 degrees, $\pm\tan^{-1}1$, $\pm\tan^{-1}1/2$, and $\pm\tan^{-1}2$, said selecting in step (c) selecting one of the plurality of predetermined modes of division including:
  a first mode having the division lines determined by x=0, y=0, x±y=½, and x±y=−½;
  a second mode having the division lines determined by x=0, y=0, x±y/2=½, and x±y/2=−½;
  a third mode having the division lines determined by x=0, y=0, x/2±y=½, and x/2±y=−½;
  a fourth mode having the division lines determined by x=0, y=0, and y=+2x≤0;
  a fifth mode having the division lines determined by x=0, y=0, and y=−2x≥0;
  a sixth mode having the division lines determined by x=0, y=0, and y=+2x≥0;
  a seventh mode having the division lines determined by x=0, y=0, and y=−2x≤0;
  an eighth mode having the division lines determined by x=0, y=0, and x=+2y≤0;
  a ninth mode having the division lines determined by x=0, y=0, and x=−2y≤0;
  a tenth mode having the division lines determined by x=0, y=0, and x=+2y≥0; and
  an eleventh mode having the division lines determined by x=0, y=0, and x=−2y≥0;

x=0 corresponds to a vertical line, y=0 corresponding to a horizontal line, and x=±½ and y=±½ determine the boundary of the unit area.

5. A process for determining values of new pixels which are to be interpolated in a unit area which is determined by four pixel centers of an original image on a display screen, and which has the four pixel centers at four corners thereof, respectively, for magnifying an image consisting of original pixels on the display screen, comprising the steps of:

(a) storing, in a plurality of registers, coordinates of a set of division lines uniquely defining a plurality of modes of division of the unit area, respectively, where, in each of the modes, the unit area is divided into sections by one of the division lines corresponding to each of the modes;

(b) detecting an angle of an original line image in a predetermined vicinity of the unit area by comparing values of a combination of original pixels in the predetermined vicinity of the unit area with each of a plurality of predetermined patterns of an arrangement of pixel values, where the detected angle is digitized to one of a plurality of original line angles;

(c) selecting one of a plurality of predetermined modes of division of the unit area so that an angle of one of the division lines of the selected mode of division conforms to the original line angle detected in step (b);

(d) determining a value for each of the new pixels by assigning a value, determined based on the values of the original pixels in the predetermined vicinity, to all of the new pixels having centers in one of the sections of the unit area generated by the mode of division selected in step (c);

(e) dividing the unit area into sub-areas corresponding to each of the original pixel centers surrounding the unit area so that all points in each sub-area are nearer to the original pixel center corresponding thereto than to any other of the original pixel centers;

(f) determining each of the sub-areas having the center of at least one of the new pixels included therein, and the predetermined patterns and the combination of the original pixels used for the comparing in step (b) being defined for each of the sub-areas, and the predetermined modes of division being defined within each of the sub-areas; and (g) modifying the original image on the display screen to produce a picture image using the values of the original pixels and the values of the new pixels generated in steps (a)–(f).

6. A process according to claim 5, wherein the unit area of the display screen is a 2×2 rectangle having one of the original pixel centers at each corner, and the predetermined vicinity for each of the original pixel centers respectively includes the original pixels arranged in a 3×3 square lattice having a center region, the 3×3 square lattice including the unit area of the display screen as the center region thereof.

7. A process according to claim 5, wherein the unit area is a rectangle having one of the four pixel centers at each corner, wherein the predetermined vicinity includes 16 original pixels arranged in a 4×4 square lattice having the unit area in a center region and eight additional original pixels positioned outside of the 4×4 square lattice in pairs of additional original pixels respectively abutting the four pixel centers located at the corners of the 4×4 square lattice, one of each pair in the vertical direction and the other of each pair in the horizontal direction, and wherein the predetermined patterns include patterns for a portion of a line image where the angle of the line image changes.

8. An apparatus for determining values of new pixels to be interpolated in a unit area determined by four original pixel centers of an original image, the unit area having the four pixel centers at four corners thereof, for magnifying an image consisting of original pixels, said apparatus comprising:

new pixel coordinate generating means for generating a coordinate of a center of a new pixel for interpolating between the original pixel centers according to a magnification rate;

pattern detecting means for detecting one of a plurality of line images by comparing values of a combination of the original pixels in a predetermined vicinity of the unit area with each of a plurality of predetermined patterns;

selector means for selecting one of a plurality of predetermined modes of division of the unit area according to the one of the line images detected in said pattern detecting means, the predetermined modes of division corresponding to the predetermined patterns, each of the predetermined modes of division dividing the unit area into sections by a set of division lines uniquely defined for each of the modes of division;

section determining means for determining a section containing the center of the new pixel located by said new pixel coordinate generating means, in accordance with information of the division lines dividing the unit area in the mode of division selected in said selector means, such that the section is one of the sections generated by each of the modes of division so that each of the new pixels in the section has the same value determined by values of the original pixels in the predetermined vicinity;

new pixel value calculating means for determining the value of the new pixel located by said new pixel coordinate generating means, according to the values of the original pixels in the predetermined vicinity and the section determined in said section determining means;

nearest original pixel determining means for determining one of the original pixel centers surrounding the unit area as nearest to the new pixel, the predetermined patterns and the predetermined vicinity being predetermined for each of the pixels centers surrounding the unit area; and picture image data generating means for generating picture image data using the values of the original pixels and the value calculated for each of the new pixels.

9. An apparatus according to claim 8, wherein said new pixel coordinate generating means comprises an accumulator, containing an adder, for calculating an x-coordinate of the center of the new pixel.

10. An apparatus according to claim 8, further comprising an original pixel data arranging means for receiving original pixel data for a plurality of lines in the original pixel image, and for selecting the original pixel data of the predetermined vicinity of the unit area.

11. An apparatus according to claim 8, wherein said selector means comprises, a set of reference value registers for holding x-coordinate values of the division lines for the plurality of modes of division for each value of a y-coordinate of the center of the new pixel; and multiplexer means for selecting the x-coordinate values of one of the division lines for one of the plurality of modes.

12. An apparatus according to claim 11, wherein said section determining means comprises comparator means for comparing the x-coordinate of the center of the new pixel with the x-coordinate values of one of the division lines selected by the multiplexer means.

13. An apparatus according to claim 8, wherein in the new pixel value calculating means, a value of the new pixels in each of the sections having the boundaries which include both x=0 and y=0 in the first to third modes of division is determined as $A*(B+C+D+F+K)+B*C*D*(F+K)$, where A is a value of a first original pixel having a center at a first corner nearest to each section, B, C, and D are the values of second, third and fourth original pixels corresponding to the remaining three pixel centers at the corners of the unit area, and F and K are values of fifth and sixth original pixels included in the predetermined vicinity, the centers of the fifth and sixth original pixels defining a hypotenuse of a right-angled isosceles triangle formed by the centers of the second, third and fourth original pixels, and the hypotenuse having a middle at the center of the first original pixel.

* * * * *

UNITED STATES PATENT AND TRADEMARK OFFICE
CERTIFICATE OF CORRECTION

PATENT NO. : 5,511,137

DATED : April 23, 1996

INVENTOR(S) : Okada

It is certified that error appears in the above-indentified patent and that said Letters Patent is hereby corrected as shown below:

Col. 1, line 30, delete "a"--.

line 55, "$I_R=p\Sigma$" should be --$I_R=\Sigma$--;

line 58, "$R_R$" (both occurrences) should be --$I_R$--.

Col. 8, line 15, "No. 3" should be --No. 7--; "P4" should be --P2--;

line 18, "$\beta$" should be --$\alpha$--;

line 19, "G8" should be --G2--.

Col. 9, line 34, "13D, and 13D" should be --13D, and 13E--;

line 40, "13B, 13B," should be --13B,--.

Col. 10, delete lines 37 and 38 in their entirety.

Col. 11, line 19, "8B, 8B," should be --8B,--;

line 23, "8B, 8B," should be --8B,--.

UNITED STATES PATENT AND TRADEMARK OFFICE
CERTIFICATE OF CORRECTION

PATENT NO. : 5,511,137
DATED : April 23, 1996
INVENTOR(S) : Okada

It is certified that error appears in the above-indentified patent and that said Letters Patent is hereby corrected as shown below:

Col. 12, line 42, after "and", line 43 should follow without new line;

line 43, "3" should be --P3--.

Col. 19, line 9, delete "[-tan θ)X]";

line 36, "he" should be --the--.

Col. 20, line 30, "corresponds" should be --corresponding--;

line 31, "determine" should be --determining--.

Signed and Sealed this

Twentieth Day of August, 1996

Attest:

BRUCE LEHMAN

*Attesting Officer*     *Commissioner of Patents and Trademarks*